(12) United States Patent
Keshet et al.

(10) Patent No.: US 8,731,318 B2
(45) Date of Patent: May 20, 2014

(54) UNIFIED SPATIAL IMAGE PROCESSING

(75) Inventors: Renato Keshet, Haifa (IL); Pavel Kisilev, Maalot (IL); Mani Fischer, Haifa (IL); Doron Shaked, Tivon (IL); Boris Oicherman, Kiriat Tivon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 321 days.

(21) Appl. No.: 13/231,411

(22) Filed: Sep. 13, 2011

(65) Prior Publication Data

US 2012/0121179 A1 May 17, 2012

Related U.S. Application Data

(63) Continuation-in-part of application No. 11/888,572, filed on Jul. 31, 2007, now abandoned.

(51) Int. Cl.
*G06K 9/40* (2006.01)

(52) U.S. Cl.
USPC ........... 382/254; 382/274; 382/275; 382/276; 382/299; 382/302; 700/4; 700/5

(58) Field of Classification Search
USPC ......... 382/254, 274–276, 298–300, 302, 304; 700/4, 5
See application file for complete search history.

(56) References Cited

U.S. PATENT DOCUMENTS

| | | | |
|---|---|---|---|
| 4,829,381 A | 5/1989 | Song et al. | |
| 5,467,404 A * | 11/1995 | Vuylsteke et al. | 382/274 |
| 5,909,516 A * | 6/1999 | Lubin | 382/302 |
| 6,005,983 A * | 12/1999 | Anderson et al. | 382/254 |
| 6,069,979 A * | 5/2000 | VanMetter | 382/260 |
| 6,252,931 B1 * | 6/2001 | Aach et al. | 382/274 |
| 6,760,401 B2 * | 7/2004 | Schmitz et al. | 378/62 |
| 6,836,560 B2 * | 12/2004 | Emery | 382/145 |
| 7,068,851 B1 | 6/2006 | Berkner | |
| 7,116,836 B2 | 10/2006 | Rising | |
| 7,522,782 B2 | 4/2009 | Lim et al. | |
| 7,672,528 B2 * | 3/2010 | Gallagher et al. | 382/256 |
| 7,783,125 B2 | 8/2010 | Lim et al. | |
| 2003/0228064 A1 * | 12/2003 | Gindele et al. | 382/260 |
| 2004/0101207 A1 * | 5/2004 | Langan | 382/274 |
| 2006/0072845 A1 * | 4/2006 | Eck et al. | 382/265 |

OTHER PUBLICATIONS

Sabine Dippel, Martin Stahl, Rafael Wiemker, and Thomas Blaffert, "Multiscale Contrast Enhancement for Radiographies: Laplacian Pyramid Versus Fast Wavelet Transform", IEEE Transaction on Medical Imaging, vol. 21, No. 4, Apr. 2002 pp. 343-353.*
Surendra Ranganath, "Image Filtering Using Multiresolution Representations", IEEE Transactions on Pattern Analysis and Machine Intelligence, vol. 13, No. 5, May 1991 pp. 426-440.*

* cited by examiner

*Primary Examiner* — Eric Rush

(57) ABSTRACT

A method for enhancing an input image to produce an enhanced output image is provided. The method includes constructing a photographic-mask intermediate image without low-contrast details and a temporary-image intermediate image with enhanced mid-contrast details, retained high-contrast details, and reduced low-contrast details, and employing values for the photographic-mask intermediate image and temporary-image intermediate image to produce the enhanced output image that is globally and locally contrast-enhanced, sharpened, and denoised.

20 Claims, 29 Drawing Sheets

202    Y(2,8) = 97

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Figure 2

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

↖ 402

H(1,2) = 0.1

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

|   | 0 | 0 |   |   |   |   |   |   |   |   |   |   |   |   |   |
|---|---|---|---|---|---|---|---|---|---|---|---|---|---|---|---|
|   |   |   |   |   |   |   |   |   |   |   |   |   |   |   |   |

Figure 4C

| 0 | 0 | 0 | 0 | 0 | 5 | 5 | 5 | 5 | 5 | 5 | 0 | 0 | 0 | 0 | 0 |
|---|---|---|---|---|---|---|---|---|---|---|---|---|---|---|---|
| 0 | 0 | 0 | 0 | 5 | 10 | 15 | 16 | 14 | 10 | 5 | 5 | 0 | 0 | 0 | 0 |
| 0 | 0 | 0 | 5 | 15 | 81 | 95 | 91 | 97 | 76 | 17 | 5 | 5 | 0 | 0 | 0 |
| 0 | 0 | 0 | 10 | 80 | 96 | 46 | 40 | 47 | 91 | 73 | 10 | 5 | 0 | 0 | 0 |
| 0 | 0 | 0 | 16 | 95 | 50 | 10 | 11 | 87 | 49 | 93 | 10 | 5 | 0 | 0 | 0 |
| 0 | 0 | 0 | 11 | 98 | 34 | 9 | 8 | 8 | 43 | 94 | 19 | 5 | 0 | 0 | 0 |
| 0 | 0 | 0 | 10 | 91 | 41 | 7 | 6 | 6 | 45 | 95 | 18 | 5 | 0 | 0 | 0 |
| 0 | 0 | 0 | 5 | 81 | 90 | 45 | 44 | 43 | 98 | 79 | 10 | 5 | 0 | 0 | 0 |
| 0 | 0 | 0 | 5 | 16 | 79 | 93 | 95 | 97 | 80 | 20 | 5 | 0 | 0 | 0 | 0 |
| 0 | 0 | 0 | 5 | 5 | 10 | 16 | 17 | 13 | 10 | 5 | 0 | 0 | 0 | 0 | 0 |
| 0 | 0 | 0 | 0 | 5 | 5 | 5 | 5 | 5 | 5 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

| | | | | | | | | | | | | | | | |
|---|---|---|---|---|---|---|---|---|---|---|---|---|---|---|---|
| | 0 | 0 | 1 | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |

Figure 4D

UNIFIED SPATIAL IMAGE PROCESSING

CROSS-REFERENCE TO RELATED APPLICATION

This application is a continuation-in-part of application Ser. No. 11/888,572, filed Jul. 31, 2007 now abandoned.

TECHNICAL FIELD

The current application is related to signal processing and, in particular, to a unified, integrated and computationally efficient method for carrying out multiple signal-processing tasks that include sharpening, local and global contrast enhancement, including 3D-boosting and adaptive lighting, and denoising.

BACKGROUND

Computational methods for signal processing provide foundation technologies for many different types of systems and services, including systems and services related to recording, transmission, and rendering of signals that encode images and graphics, including photographic images, video signals, and other such signals. Over the years, many different types of image-enhancement functionalities have been devised and implemented, including computational routines and/or logic circuits that implement sharpening, contrast enhancement, denoising, and other, discrete image-enhancement tasks. In many currently available systems and devices that employ image-enhancement routines and/or logic circuits, image enhancement is carried out by sequential execution of a number of discrete modules and/or logic circuits that implement each of a number of discrete image-enhancement tasks. As the number of image-enhancement tasks and procedures has increased, the number of discrete image-enhancement modules and/or logic circuits successively called to carry out image enhancement within various systems and devices has also increased. Designers, developers, and vendors of image-enhancement software, image-enhancement-related logic circuits, image-enhancement-related systems and devices, and a large number of different types of devices that include image-enhancement functionality continue to seek greater computational efficiency, flexibility, and effectiveness in image-enhancement-related software, hardware, systems, and methods.

SUMMARY

The current application is directed to methods and systems for image processing that are unified in nature, carrying out many image-enhancement tasks together in a unified approach, rather than sequentially executing separately implemented, discrete image-enhancement tasks. In addition, the currently disclosed methods and systems can apply image-enhancement to local, spatial regions of an image, rather than relying on global application of enhancement techniques that are limited in terms of flexibility, strength, and quality. In certain example implementations, various different types of intermediate images are produced at each of a number of different scales from a received, input image. From these intermediate images, a photographic mask and temporary image are obtained, and the photographic mask and temporary image are then employed, along with a look-up table or function that receives values from the photographic mask and temporary image, to compute an enhanced, output image. In a described implementation, the intermediate images include low-pass, band-pass, photographic-mask, and temporary-image intermediate images computed at each of a number of different scales.

BRIEF DESCRIPTION OF THE DRAWINGS

FIG. 2 shows the two-dimensional image of FIG. 1 with numerical pixel values.
FIGS. 4A-E illustrate a convolution operation.

DETAILED DESCRIPTION

The current application discloses systems and methods that are related to comprehensive image enhancement of signals that encode various types of images, including photographic images, video frames, graphics, and other visually rendered signals. Comprehensive image enhancement may include sharpening, global and local contrast enhancement, denoising, and other, discrete image-enhancement tasks. Global contrast enhancements include brightening, darkening, histogram stretching or equalization, and gamma correction. Local contrast enhancements include adaptive lighting, shadow lighting, highlight enhancement, and 3D boosting. It should be noted that image enhancement, and signal-processing techniques related to image enhancement, may be applied to a variety of different types of signals in addition to signals representing two-dimensional images. The currently disclosed methods may therefore be applied to many different types of signals. However, in the following discussion, examples are based on enhancement of two-dimensional photographic images.

Figure 1:
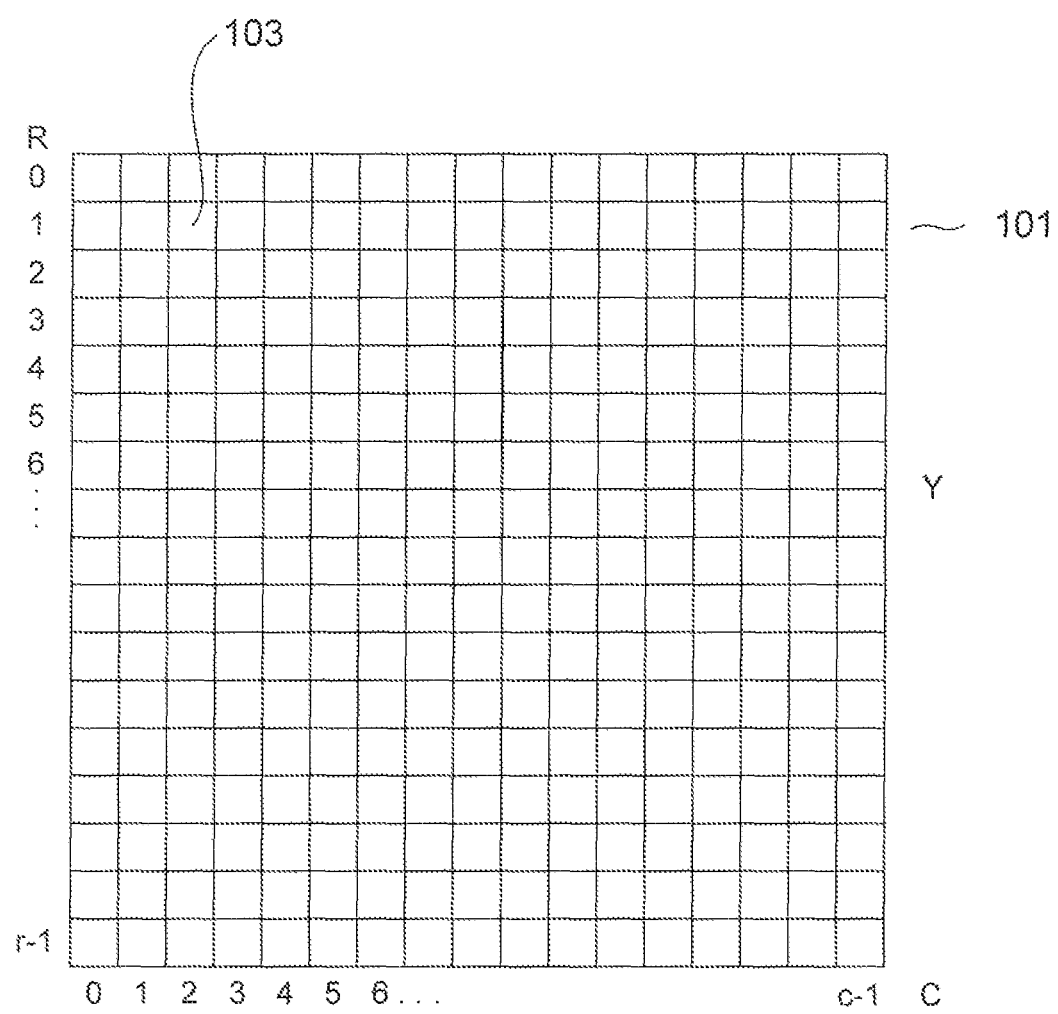
FIG. 1 illustrates a two-dimensional image signal.

FIG. 1 illustrates a two-dimensional image signal. As shown in FIG. 1, the two-dimensional image signal can be considered to be a two-dimensional matrix 101 containing R rows, with indices 0, 1, ..., r−1, and C columns, with indices 0, 1, ..., c−1. In general, a single upper-case letter, such as the letter "Y," is used to present an entire image. Each element, or cell, within the two-dimensional image Y shown in FIG. 1 is referred to as a "pixel" and is referred to by a pair or coordinates, one specifying a row and the other specifying a column in which the pixel is contained. For example, cell 103 in image Y is represented as Y(1,2).

FIG. 2 shows the two-dimensional image of FIG. 1 with numerical pixel values. In FIG. 2, each pixel is associated with a numerical value. For example, the pixel Y(2,8) 202 is shown, in FIG. 2, having the value "97." In certain cases, particularly black-and-white photographs, each pixel may be associated with a single, grayscale value, often ranging from 0, representing black, to 255, representing white. For color photographs, each pixel may be associated with multiple numeric values, such as a luminance value and two chrominance values, or, alternatively, three RBG values. In addition, numeric values may specify lightness values, in certain color schemes, hues, and other numeric-value components of various color-image-representations. In cases in which pixels are associated with more than one value, image-enhancement techniques may be applied separately to partial images, each representing a set of one type of pixel value selected from each pixel, image-enhancement techniques may be applied to a computed, single-valued-pixel image in which a computed value is generated for each pixel by a mathematical operation on the multiple values associated with the pixel in the original image, or image-enhancement techniques may be primarily applied to one partial image, such as the luminance partial image or lightness partial image. In the following discussion, images are considered to be single-valued, as, for example, grayscale values associated with pixels in a black-and-white photograph. However, the disclosed methods may be straightforwardly applied to images and signals with multi-valued pixels, either by separately sharpening one or more partial images or by combining the multiple values associated with each pixel mathematically to compute a single value associated with each pixel, and sharpening the set of computed values. It should be noted that, although images are considered to be two-dimensional arrays of pixel values, images may be stored and transmitted as sequential lists of numeric values, as compressed sequences of values, or in other ways. The following discussion assumes that, however images are stored and transmitted, the images can be thought of as two-dimensional matrices of pixel values that can be transformed by various types of operations on two-dimensional matrices.

In the following subsections, a number of different types of operations carried out on two-dimensional images are described. These operations range from simple numeric operations, including addition and subtraction, to convolution, scaling, and robust filtering. Following a description of each of the different types of operations, in separate subsections, a final subsection discusses certain of the currently claimed image processing systems and methods that are implemented using these operations.

Image Subtraction and Addition

Figure 3:
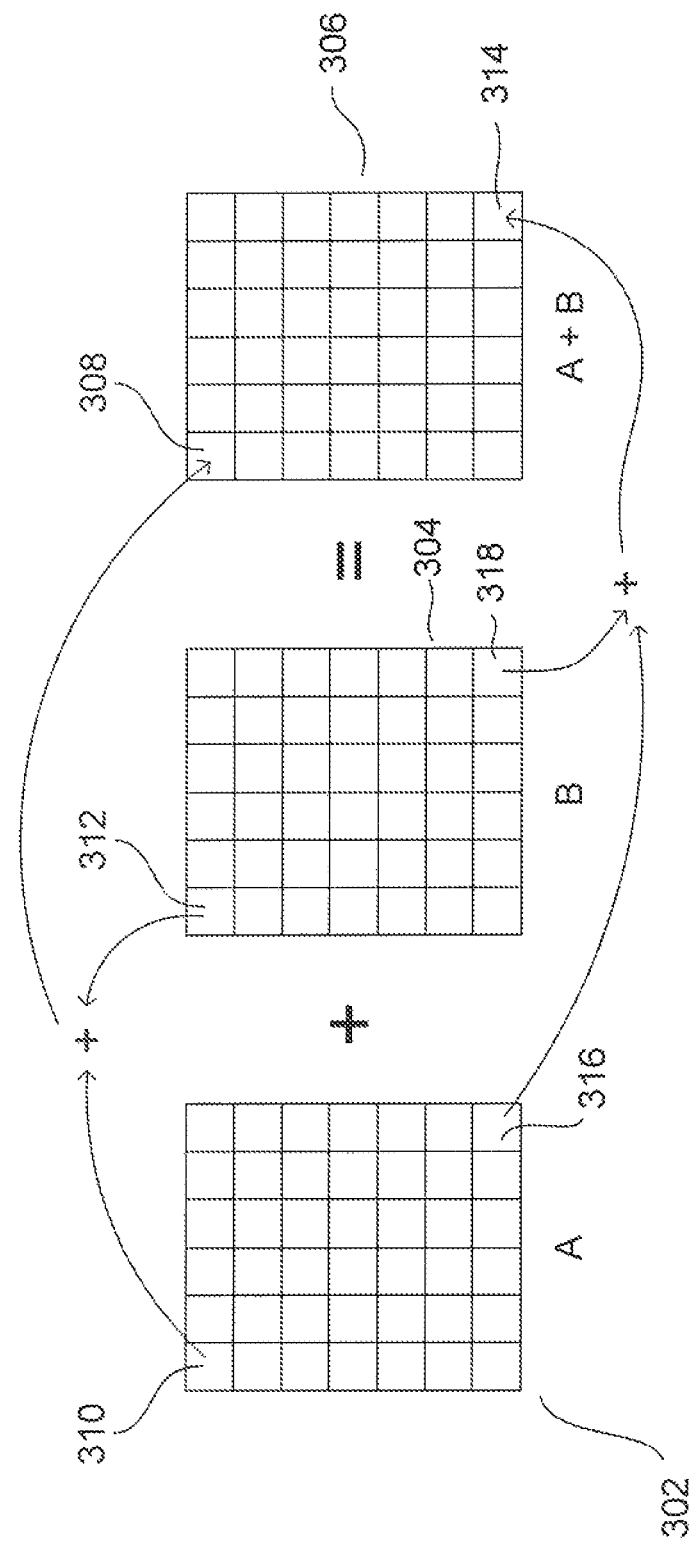
FIG. 3 illustrates addition of two images A and B.

FIG. 3 illustrates addition of two images A and B. As shown in FIG. 3, addition of image A 302 and image B 304 produces a result image A+B 306. Addition of images is carried out, as indicated in FIG. 3, by separate addition of each pair of corresponding pixel values of the addend images. For example, as shown in FIG. 3, pixel value 308 of the result image 306 is computed by adding the corresponding pixel values 310 and 312 of addend images A and B. Similarly, the pixel value 314 in the resultant image 306 is computed by adding the corresponding pixel values 316 and 318 of the addend images A and B. Similar to addition of images, an image B can be subtracted from an image A to produce a resultant image A−B. For subtraction, each pixel value of B is subtracted from the corresponding pixel value of A to produce the corresponding pixel value of A−B. Images may also be pixel-by-pixel multiplied and divided.

Convolution

Figure 4A:
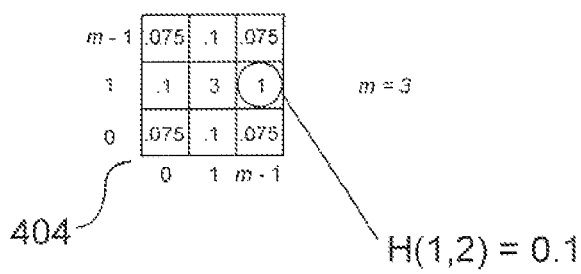

A second operation carried out on two-dimensional images is referred to as "convolution." FIGS. 4A-E illustrate a convolution operation. Convolution involves, in general, an image 402 and a kernel 404. The kernel 404 is normally a small, two-dimensional array containing numeric values, as shown in FIG. 4A, but may alternatively be a second image. Either an image or a kernel may have a different number of rows than columns, but, for convenience, the example images and kernels used in the following discussion are generally shown as square, with equal numbers of rows and columns. The image Y 402 in FIG. 4A has 17 rows and columns, while the kernel 404 H has three rows and columns.

Figure 4B:
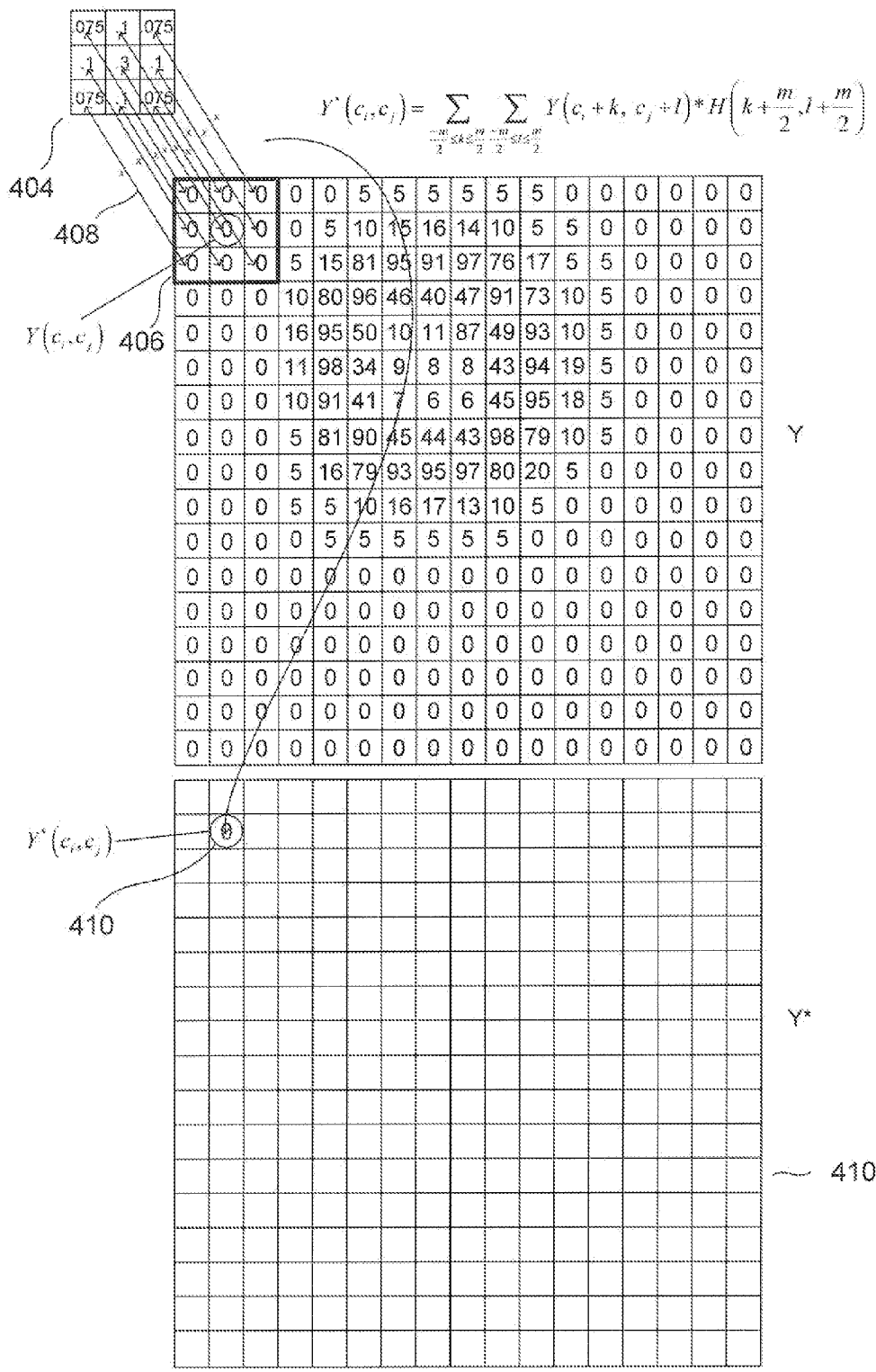

FIG. 4B illustrates computation of the first cell value, or pixel value, of the image Y* that is the result of convolution of image Y with kernel H, expressed as:

$$Y^* = Y \otimes H$$

As shown in FIG. 4B, the kernel H 404 is generally overlaid with a region of corresponding size and shape 406 of the image centered at image pixel Y(1,1). Then, each value in the region of the image 406 is multiplied by the corresponding kernel value, as shown by the nine arrows, such as arrow 408, in FIG. 4B. The value for the corresponding pixel Y*(1,1) 410 is generated as the sum of the products of the nine multiplications. In the general case, Y*($c_i,c_j$) is computed as follows:

$$Y^*(c_i, c_j) = \sum_{\frac{-m}{2} \le k \le \frac{m}{2}} \sum_{\frac{-m}{2} \le l \le \frac{m}{2}} Y(c_i + k, c_j + l) * H\left(k + \frac{m}{2}, l + \frac{m}{2}\right)$$

where m is the size of each dimension of H, and k and l have integer values within the ranges $$\frac{-m}{2} \le k \le \frac{m}{2} \text{ and } \frac{-m}{2} \le l \le \frac{m}{2} \text{ and } k + \frac{m}{2} \text{ and } l + \frac{m}{2}$$

also take on integer values. FIGS. 4C and 4D illustrate computation of the second and third values of the resultant image Y*. Note that, because the kernel H is a 3×3 matrix, the kernel cannot be properly overlaid with image pixels along the border of image Y. In certain cases, special border kernels may be used on boundary pixels, such as, for example, 2×3 kernels for interior, horizontal boundary regions. In other cases, the boundary pixel values are simply transferred to the resultant image, without a kernel-based transformation. In still other cases, the boundary pixels are omitted from the resultant image, so that the resultant image has fewer rows and columns than the original image. Details of treatment of boundary regions is not further discussed in the current application. It is assumed that any of the above-mentioned techniques for handling boundary pixels, or other appropriate techniques, may be applied to handle boundary pixels.

Figure 4E:
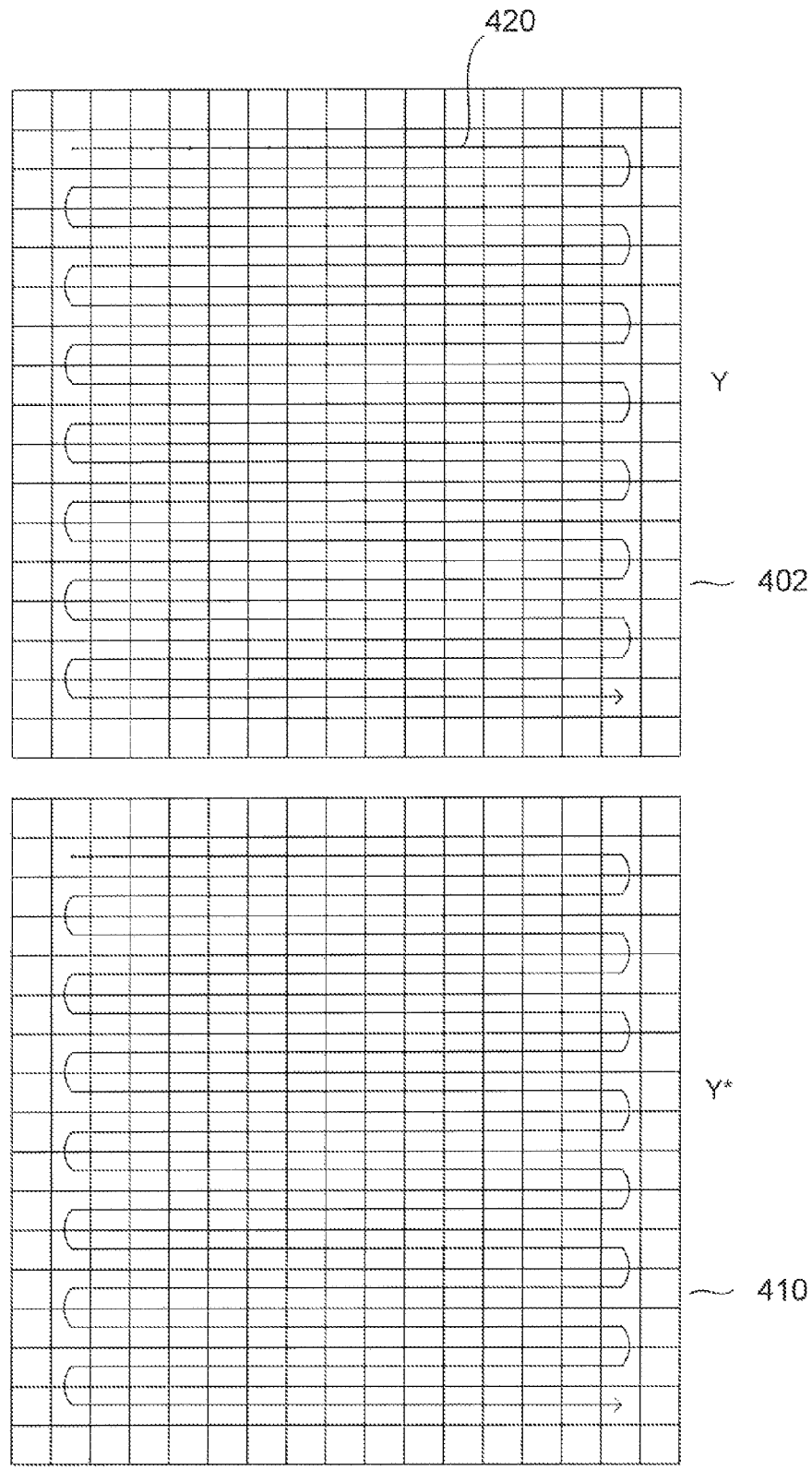

FIG. 4E illustrates a path of application of the kernel H to image Y during convolution of Y×H to produce image Y*. In FIG. 4E, the path is represented by the curved arrow 420 and shows the series of successive pixels on which the kernel is centered in order to generate corresponding values for the resultant image Y* 410. In alternative implementations, a different ordering of individual kernel-based operations may be employed. However, in all cases, a single kernel-based operation, such as that shown in FIG. 4B, is applied to each non-boundary pixel of image Y in order to produce a corresponding value for the resultant image Y*.

Scaling

Figure 5:
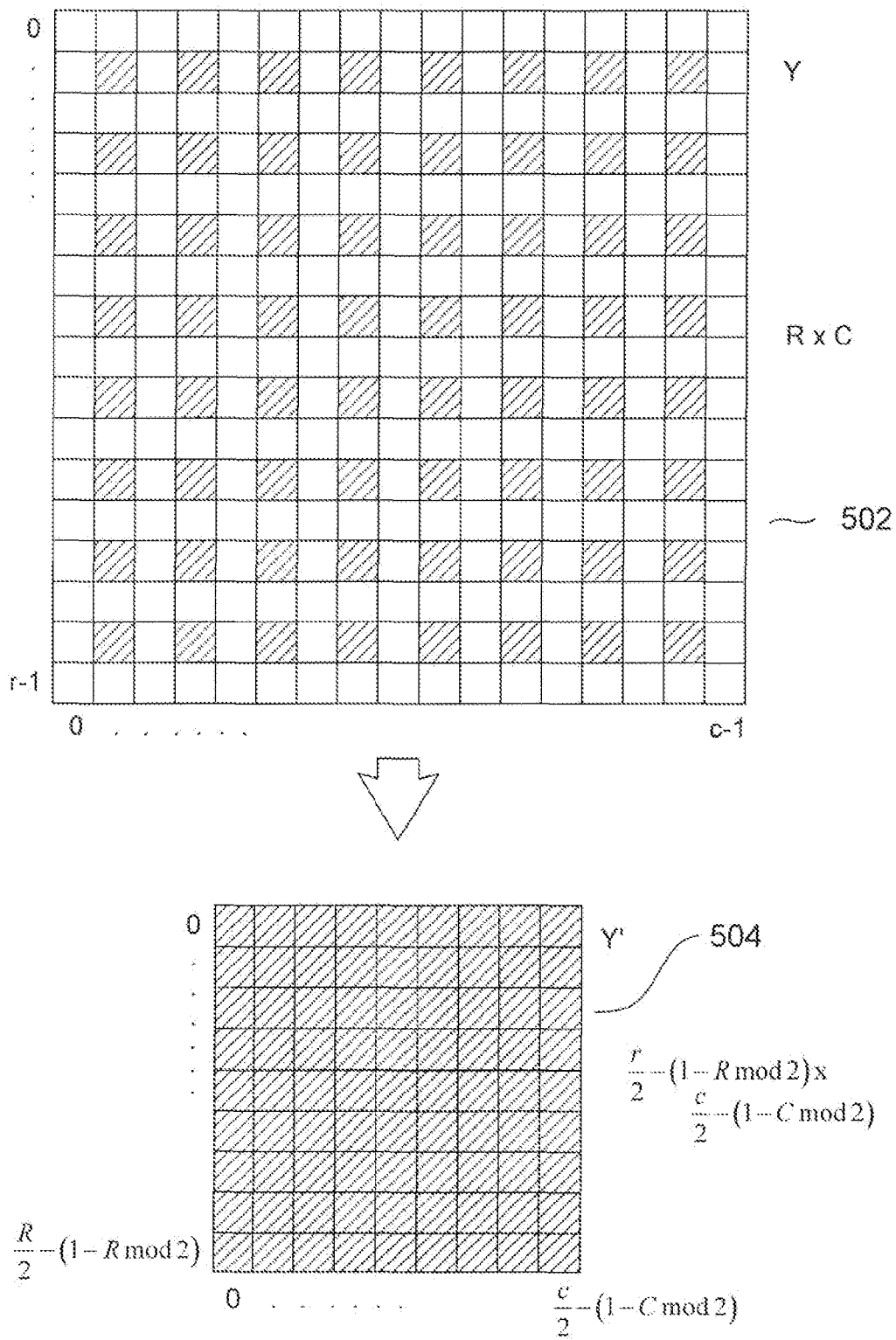
FIG. 5 illustrates one type of scaling operation, referred to as "downscaling.

FIG. 5 illustrates one type of scaling operation, referred to as "down scaling." As shown in FIG. 5, a first, original image Y 502 may be downscaled to produce a smaller, resultant image Y' 504. In one approach to downscaling, every other pixel value, shown in original image Y in FIG. 5 as cross-hatched pixels, is selected and combined together with the same respective positions in order to form the smaller, resultant image Y' 504. As shown in FIG. 5, when the original image Y is a R×C matrix, then the downscaled image Y' is an $$\left[\frac{R}{2} - (1 - R\bmod 2)\right] \times \left[\frac{C}{2} - (1 - C\bmod 2)\right]$$

image. The downscaling shown in FIG. 5 decreases each dimension of the original two-dimensional matrix by an approximate factor of ½, thereby creating a resultant, downsized image Y' having ¼ of the number of pixels as the original image Y. The reverse operation, in which a smaller image is expanded to produce a larger image, is referred to as upscaling. In the reverse operation, values need to be supplied for ¾ of the pixels in the resultant, larger image that are not specified by corresponding values in the smaller image. Various methods can be used to generate these values, including computing an average of neighboring pixel values, or by other techniques. In FIG. 5, the illustrated downscaling is a ½×½ downscaling. In general, images can be downscaled by arbitrary factors, but, for convenience, the downscaling factors generally select, from the input image, evenly spaced pixels with respect to each dimension, without leaving larger or unequally-sized boundary regions. Images may also be downscaled and upscaled by various non-linear operations, in alternative types of downscaling and upscaling techniques.

Currently Available Image-Enhancement Methods and Systems

In general, image enhancement is a type of signal processing that involves altering pixel values within an image in order to produce various desirable transformations. These transformations include enhancing the contrast of various features or regions within the image, in order to sharpen the image and increase an observer's perception of depth within the image, remove noise from the image, to deblur the image, to correct various distortions and aberrations within the image resulting from image-acquisition by image-capture devices, and to remove artifacts and distortions introduced into the image by previously applied types of signal processing and image processing. As mentioned above, each of the different image-enhancement tasks are often separately implemented as routines and/or logic circuits within various systems and devices. In order to carry out enhancement of images, each of the separately implemented modules, routines, and/or logic circuits are separately called and sequentially executed in order to achieve a desired, comprehensive image enhancement.

Figure 6:
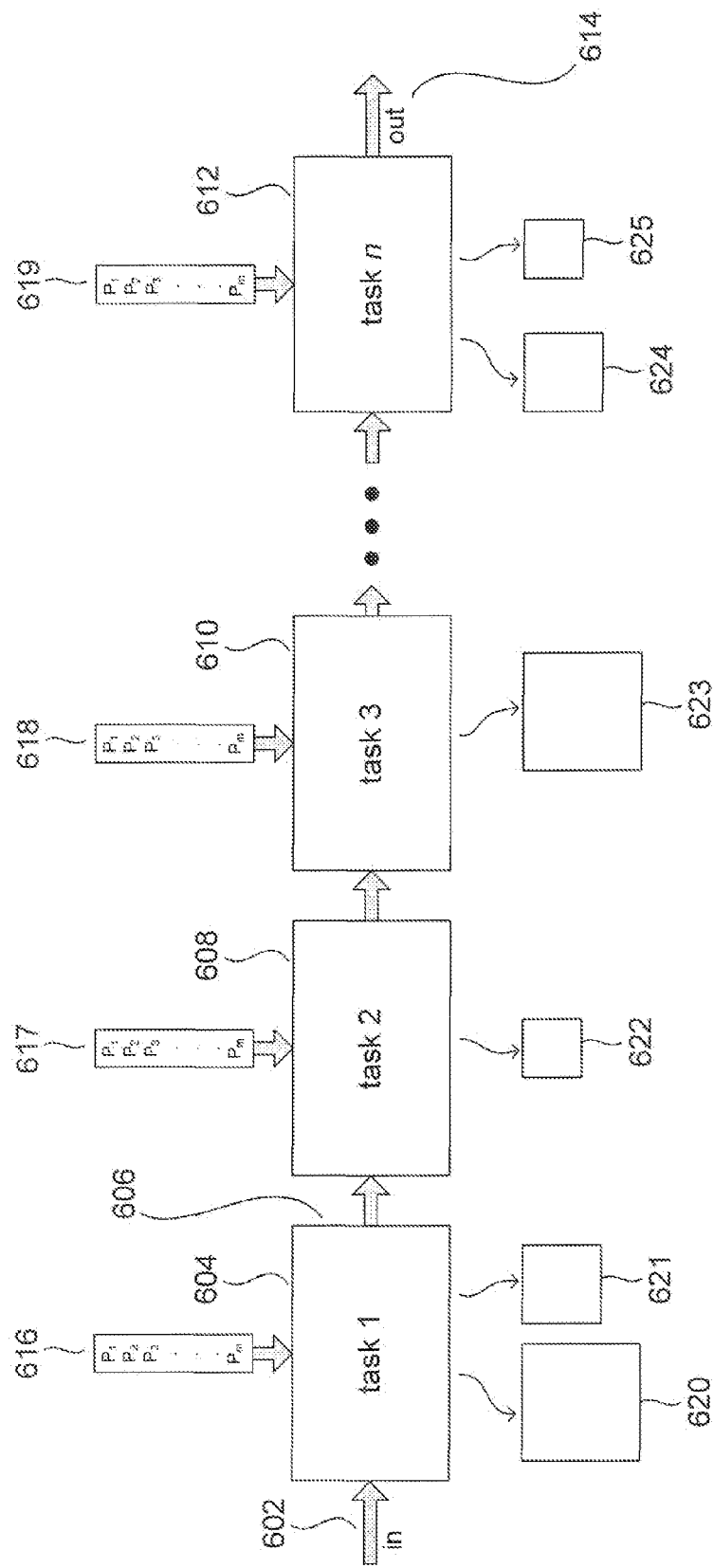
"
FIG. 6 illustrates a current approach to comprehensive image enhancement.

FIG. 6 illustrates a current approach to comprehensive image enhancement. As shown in FIG. 6, a signal or image is input 602 to a first image-enhancement routine and/or logic circuit 604 to produce an intermediate, partially enhanced output signal 606 that is input to a second, discrete image-enhancement routine and/or logic circuit 608. Additional routines and/or logic circuits 610 and 612 are called successively to carry out additional types of image enhancement in order to finally output a desired, comprehensibly enhanced output signal 614. Each of the discrete image-enhancement tasks 604, 608, 610, and 612 are associated with various parameters particular to each task, 616-619, respectively. Each discrete task May also generate, during the course of carrying out a particular facet of image enhancement, various intermediate results 620-625.

While it is true that sequential execution of the various modules, routines, and/or logic circuits that represent different tasks results in output of a desired, enhanced image 614, the sequential execution of the series of tasks, as shown in FIG. 6, may be associated with significant computational inefficiency, latency, and a need for rather tedious parameter adjustment and specification in order to achieve desired results. For example, as shown in FIG. 6, each task generates various intermediate results 620-625. These intermediate results may be intermediate images with computed pixel values different from those of the input image, or may be other relatively large sets of computed values. In certain cases; two different tasks may compute the same intermediate results, such as intermediate images 620 and 623 in FIG. 6 generated by the first and third tasks 604 and 610. Because the various, discrete modules, routines, and/or logic circuits are often not developed to be included with other modules, routines, and/or logic circuits within a larger module comprising a series of tasks, as shown in FIG. 6, they often cannot import and use intermediate results computed by previously executed tasks, nor can they store intermediate results for subsequently executed tasks. Moreover, formatting conventions, data structures, and numerical representations may differ from module to module. For these reasons, in a sequential execution of discrete image-enhancement tasks, a large number of processor cycles may end up being used to repeat lengthy calculations of intermediate results that could have been stored by first-executed tasks and retrieved for later use by subsequently executed tasks.

Figure 7:
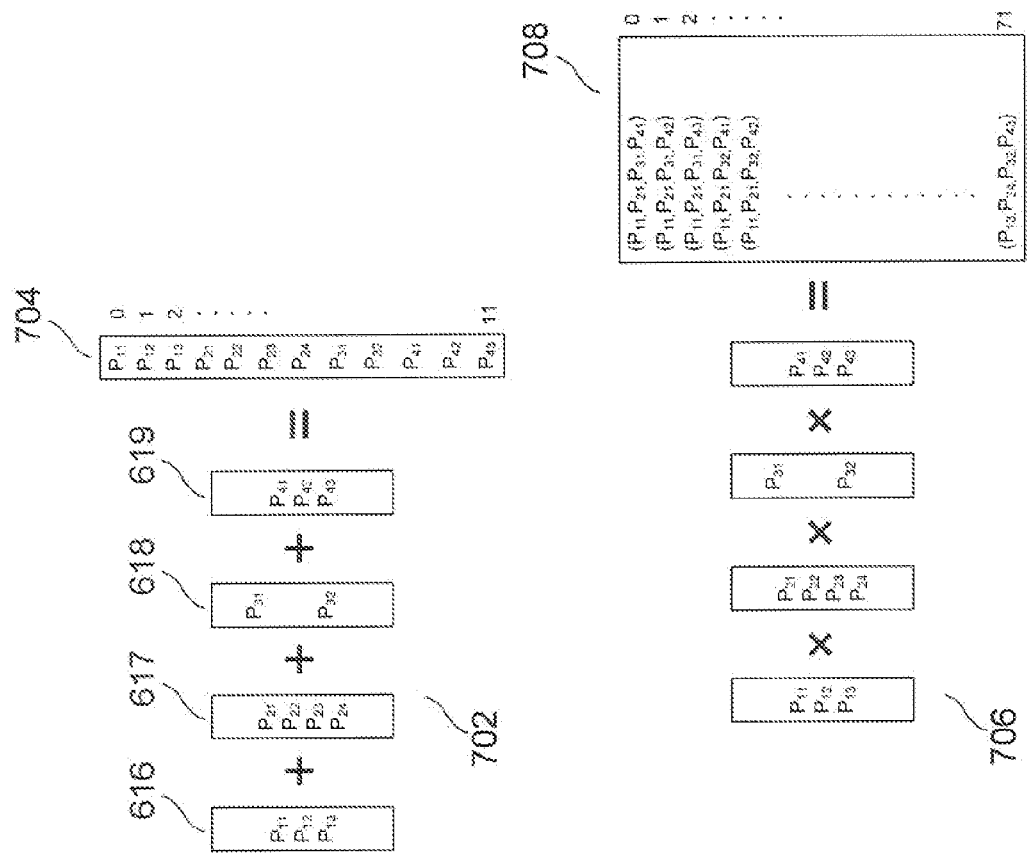
FIG. 7 illustrates two extremes in parameter specification for execution of a series of discrete image-enhancement tasks.

A different type of inefficiency involves the different sets of parameters 616-619 that need to be input to the different modules, routines, and/or logic circuits. FIG. 7 illustrates two extremes in parameter specification for execution of a series of discrete image-enhancement tasks. In a best case 702, the different sets of parameters 616-619 are independent from one another, so that the four discrete sets of parameters 616-619 may be logically combined together to form a comprehensive set of parameters 704 by adding together the four discrete sets of parameters 616-619. In other words, the comprehensive set of parameters 704 can be considered to be input parameters for the entire image-enhancement operation involving sequential execution of discrete tasks, and is formed by appending the separate sets of parameters 616-619 together, with the size of the comprehensive set of parameters 704 equal to the sum of the sizes of the discrete parameter lists 616-619. Adjustment of the parameters of the comprehensive set of parameters 704 is thus a well-bounded task that can be straightforwardly addressed by the same techniques used to adjust parameters for the individual, discrete tasks within the sequence of tasks that together comprise the image-enhancement method or system. Unfortunately, the individual tasks sequentially executed in order to carry out comprehensive image enhancement are generally not independent from one another. Changing the parameters of an upstream task may greatly change the effects of parameters supplied to, and behavior of, a downstream task, requiring additional adjustment of the downstream's parameters in order to achieve a desired result. In a worst case 706, all of the parameters are interdependent, so that a comprehensive parameter list 708 for the comprehensive image enhancement is generally an n-way cross product of the n individual parameters lists for the individual, discrete tasks that are sequentially executed in order to carry out the comprehensive image enhancement. This produces a much longer list of parameters, each parameter in the list being a linear combination of n parameters selected from the n, discrete parameters lists for the n individual tasks sequentially executed in order to carry out comprehensive image enhancement. Adjusting a lengthy, complex parameter list such as parameter list 708 in FIG. 7 is not at all a straightforward task. In general, the set of parameters for a comprehensive image enhancement comprising a number of sequentially executed modules, routines, and/or logic circuits, as shown in FIG. 6, fall somewhere between the best case 702 and worst case 706 shown in FIG. 7. However, even when not the worst case 706, parameter adjustment for the entire comprehensive image enhancement when parameter lists of individual tasks are at least partially dependent on one another may represent a significant burden, and involve significant and continuous human intervention in order to produce a desired enhancement of each of a number of particular images or particular types of images.

Many additional issues arise when attempting to combine various modules, routines, and/or logic circuits designed to carry out individual tasks or sets of tasks that need to be sequentially executed in order to achieve comprehensive image enhancement. In certain cases, even selecting the ordering of execution of the individual task may be non-trivial. Certain orderings may involve minimal adjustment of individual tasks and parameter specifications, while other orderings may involve time-consuming and complex adjustments. Maintenance of a large number of individual task implementations may also involve issues, especially when the tasks are developed using different programming languages and other programming parameters and are designed for different hardware platforms or devices. For all of these reasons, designers, developers, manufacturers, and vendors of image-enhancement systems and other systems and devices that employ image-enhancement subsystems and functionalities recognize the need for a unified, comprehensive approach to image enhancement, rather than sequential execution of discrete, individual subtasks of a comprehensive image-enhancement strategy.

Example Image-Processing Systems and Methods

The current application is directed to a unified approach to comprehensive image enhancement in which a number of different facets of image enhancement are carried out concurrently through a multi-scale image decomposition that produces a number of series of intermediate images and reconstruction of the intermediate images to generate a final, enhanced image for output. Two intermediate images at highest-resolution scale, used in subsequent processing, are computed by a first portion of the method that includes computation of a number of different intermediate images at each of the number of different scales. The two intermediate images include a photographic mask and a temporary image. The photographic mask is a transformation of the luminance, lightness, grayscale, or other values of the input image in which details with a contrast below a relatively high threshold are removed. The temporary image represents a transformation of the input image in which details with a contrast above a low threshold are enhanced, details with a contrast below the low threshold are removed, and details above a high threshold are preserved. The high and low threshold may vary from one scale to another. The values that the high and low thresholds are generally non-negative values that range from zero to a practically infinite, positive value. When the low threshold is equal to zero, no details are removed from the temporary image. When the high threshold is practically infinite, all details are removed from the photographic mask, and all details are enhanced in the temporary image. The temporary image includes the details that are transformed to carry out 3D boosting, sharpening, and denoising of an image. In certain implementations, once the highest-resolution-scale versions of the photographic mask and temporary image are obtained, through a computational process described below, luminance or grayscale values of the photographic mask and temporary image can be used, pixel-by-pixel, as indices into a two-dimensional look-up table to generate output pixel values for a final, resultant, contrast-enhanced output image.

Figure 8A:
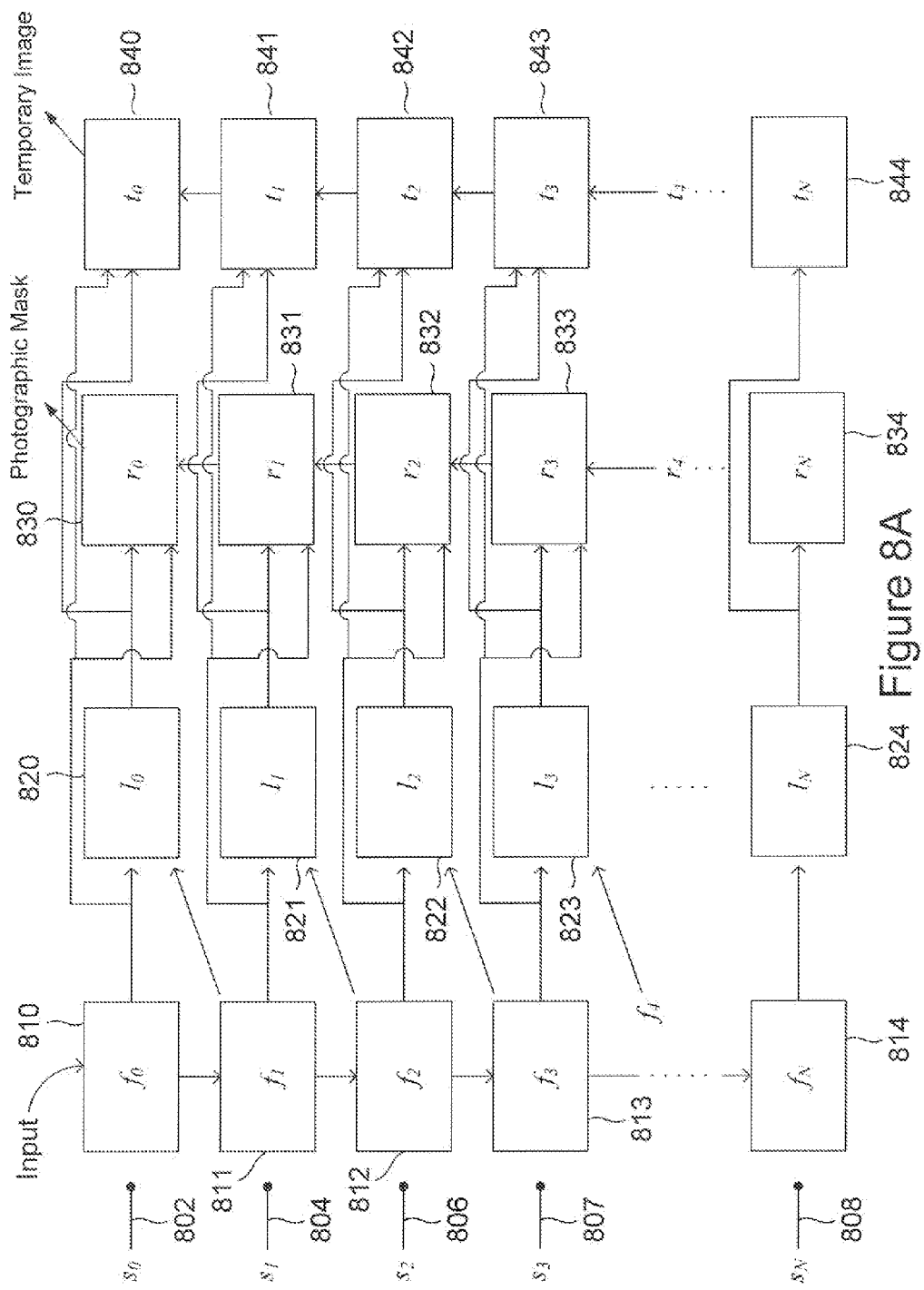
FIGS. 8A-B illustrate, at a high level, generation of the photographic mask and temporary image and use of the photographic mask and temporary image to generate a locally and globally contrast-enhanced, sharpened, and denoised output image.
Figure 8B:
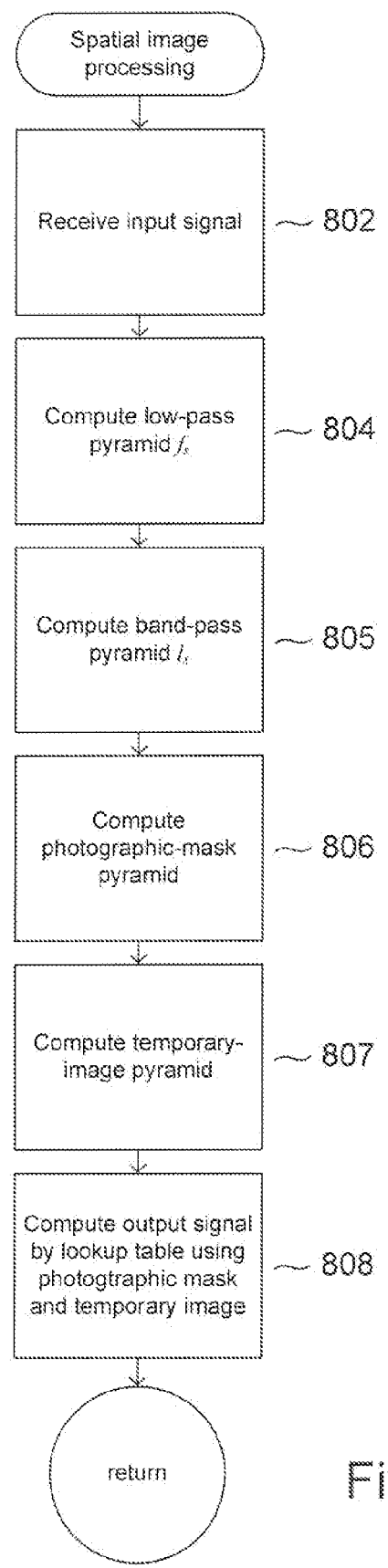

FIGS. 8A-B illustrate, at a high level, generation of the photographic mask and temporary image and use of the photographic mask and temporary image to generate a locally and globally contrast-enhanced, sharpened, and denoised output image. FIG. 8A shows the first portion of computation leading to computation of a photographic mask and temporary image at the highest-resolution scale, $s_0$, the original scale of the input image. In FIG. 8A, scales of various intermediate images are represented by horizontal regions of the figure, each horizontal region corresponding to a different scale. The top-level horizontal region represents the highest-resolution scale $s_0$ 802. The next-highest horizontal region represents a next-lowest resolution scale $s_1$ 804. FIG. 8A shows three additional lower-resolution scales 806-808. At each scale, four different intermediate images are generated. For example, at scale $s_0$ (802), four intermediate images $f_0$ 810, $l_0$ 820, $r_0$ 830, and $t_0$ 840 are generated. At each of N+1 scales i employed within the unified comprehensive image-enhancement method, where N may be specified as a parameter or, alternatively, may be an implementation detail, four intermediate images $f_i$, $l_i$, $r_i$, and $t_i$ are generated. Each column of intermediate images in FIG. 8A, where each column is headed by one of the highest-resolution-scale intermediate images $f_0$ 810, $l_0$ 820, $r_0$ 830, and $t_0$ 840, represents a pyramid of intermediate images, widest at the top and decreasing in width, generally by a constant factor, such as "2," at each level to the smallest, lowest-resolution intermediate image $f_n$ 814, $l_n$ 824, $r_n$ 834, and $t_n$ 844. Intermediate images 810-814 represent the f pyramid, intermediate images 820-824 represent the l pyramid, intermediate images 830-834 represent the r pyramid, and intermediate images 840-844 represent the t pyramid.

The temporary images computed at each scale include: (1) $f_0, f_1, \ldots, f_N$, low-pass intermediate images generated by, for scales of lower resolution than the highest-resolution scale $s_0$, a robust decimation operator to be described below; (2) $l_0, l_1, \ldots l_N$, band-pass intermediate images produced, at scales of greater resolution than the lowest-resolution scale, by subtraction of a bilaterally interpolated image from a corresponding low-pass image, as described below; (3) photographic-mask ("PM") intermediate images $r_0, r_1, \ldots, r_N$, photographic mask images computed using bilateral interpolation, as described below; and (4) temporary-image images ("TI") $t_0, t_1, \ldots, t_N$, computed using bilateral interpolation in a process described below. In certain expressions provided below, the notation $f_s$ is used to represent the collection of intermediate images in the f pyramid, $f_0, f_1, \ldots, f_N$, the notation $l_s$ is used to represent the collection of intermediate images in the l pyramid, $l_0, l_1, \ldots, l_N$, the notation $r_s$ is used to represent the collection of intermediate images in the r pyramid, $r_0, r_1, \ldots, r_N$, and the notation $t_s$ is used to represent the collection of intermediate images in the t pyramid, $t_0, t_1, \ldots, t_N$. The highest-resolution-scale PM and TI intermediate images, 830 and 840, respectively, in FIG. 8A are the photographic mask and temporary image used in a second phase of computation to generate a comprehensively enhanced image for output.

In the computational diagram shown in FIG. 8A, it can be seen, by observing arrows input to each intermediate image, that each intermediate image of the low-pass pyramid $f_1, f_2, \ldots, f_N$ is computed from a higher-resolution-scale low-pass image, with the first low-pass intermediate image $f_0$ obtained as the input signal. The successive low-pass intermediate images are computed in an order from next-to-highest-resolution scale $s_1$ to lowest-resolution scale $s_N$. The hand-pass-pyramid intermediate images $l_0, l_1, \ldots, l_{N-1}$ may be computed in either top-down or an opposite order, with the lowest-resolution-scale band-pass intermediate image $l_N$ obtained as the lowest-resolution-scale low-pass intermediate image $f_N$ and higher-resolution-scale band-pass intermediate images $l_{N-1}, l_{N-2}, \ldots l_0$ each computed from both the next-lower-resolution low-pass image and the low-pass intermediate image at the same scale. The PM intermediate images and TI intermediate images $r_0, r_1, \ldots r_N$ and $t_0, t_1, \ldots, t_N$ are computed from next-to-lowest-resolution-scale $s_{N-1}$ to highest-resolution scale $s_0$. Each higher-resolution-scale PM image $r_i$ is computed from $r_{i+1}, f_i$ and $l_i$, and each higher-resolution-scale TI image $t_i$ is computed from $t_{i+1}, f_i$, and $l_i$. Thus, the low-pass pyramid $f_0, f_i, \ldots, f_N$ is computed from base to apex, while the remaining pyramids are computed from apex to base. Computation of each of the different types of intermediate images $f_i, l_i, r_i$, and $t_i$ is discussed in separate subsections, below.

FIG. 8B is a high-level control-flow diagram for an image-processing method. In step 802, an input signal, generally a photographic image, graphic, or video-signal frame, is received. In step 804, the low-task pyramid $f_0, f_1, \ldots, f_N$ is computed. In step 805, the band-pass pyramid $l_0, l_1, \ldots, l_N$ is computed. In step 806, the PM pyramid $r_0, r_1, r_2, \ldots, r_N$ is computed. In step 807, the TI pyramid $t_0, t_1, \ldots, t_N$ is computed. Using the highest-resolution-scale PM and TI (830 and 840 in FIG. 8A, respectively), an output signal is computed, in step 808, by using PM and TI pixel values, pixel-by-pixel, as indices of a two-dimensional look-up table to generate output-image pixel values.

The multi-scale pyramid approach discussed above has great advantages in computational efficiency. In alternative approaches, bilateral filters with very large kernels are applied to the images at a single scale in order to attempt to produce intermediate images similar to a photographic mask. However, large-kernel bilateral filter operations are extremely computationally expensive. A multi-scale approach provides results equivalent to those obtained by certain large-kernel bilateral filter operations at a much lower cost in processor cycles and computation time.

In certain currently available image-enhancement methods, each pixel of an image is passed through a one-dimensional look-up table ("1D LUT"), with the 1D LUT designed to achieve the desired effects by amplifying certain portions of an image and compressing certain other portions of the image. In other words, the LUT represents a function applied to pixel values within a range of pixel values, in certain cases multiplying differences of pixel values of the original image by values greater than 1.0, to effect detail amplification, and in other cases multiplying differences of pixel values of the original image by values less than 1.0, to effect detail compression. Methods are designed to amplify all regions of an image by multiplying the differences of pixels of values of each region by a constant greater than or equal to 1.0. In this family of methods, the PM is passed through a 1D LUT, at least logically, to generate an enhanced PM which is then combined with an intermediate details image obtained by subtracting the PM from the TI. This overall method can be simplified by using a two-dimensional look-up table.

Figure 9:
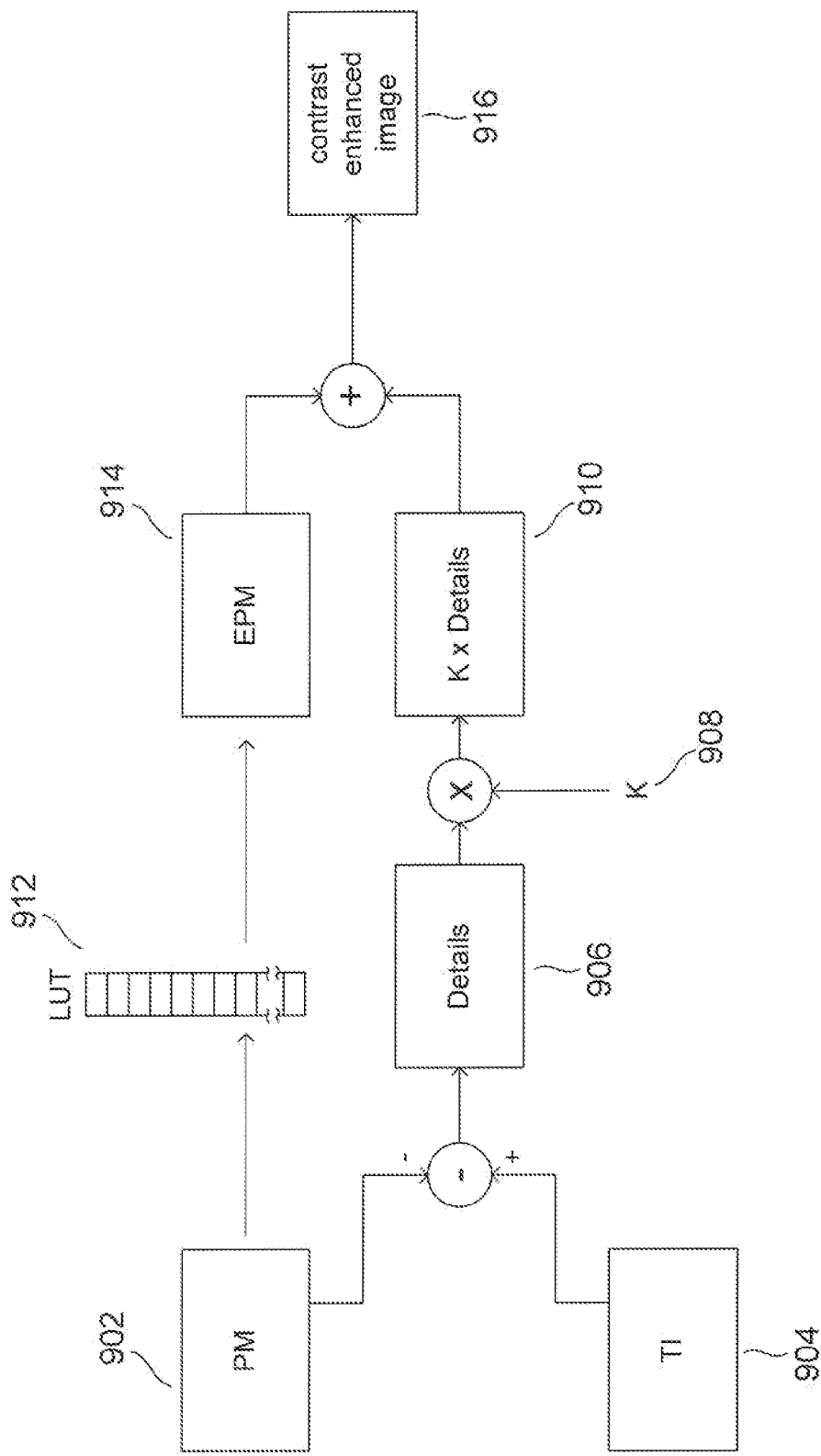
FIG. 9 illustrates a generalized, second part of comprehensive image enhancement.

FIG. 9 illustrates a generalized, second part of comprehensive image enhancement. This second part of the present method begins, in FIG. 9, with the PM 902 and TI 904 obtained from the highest-resolution-scale PM intermediate image $r_0$ and the highest-resolution-scale TI intermediate image $t_0$ (830 and 840 in FIG. 8A). A details intermediate image $t_0$ (830 and 840 in FIG. 8A). A details intermediate image 906 is computed by subtracting the PM 902 from the TI 904. The details are then multiplied by a constant k 908 to produce an amplified details intermediate image 910. The PM 902 is transformed through a one-dimensional LUT 912 to generate an enhanced PM 914. The enhanced PM 914 is then added to the amplified details image 910 to produce a final, contrast-enhanced image 916.

Figure 10:
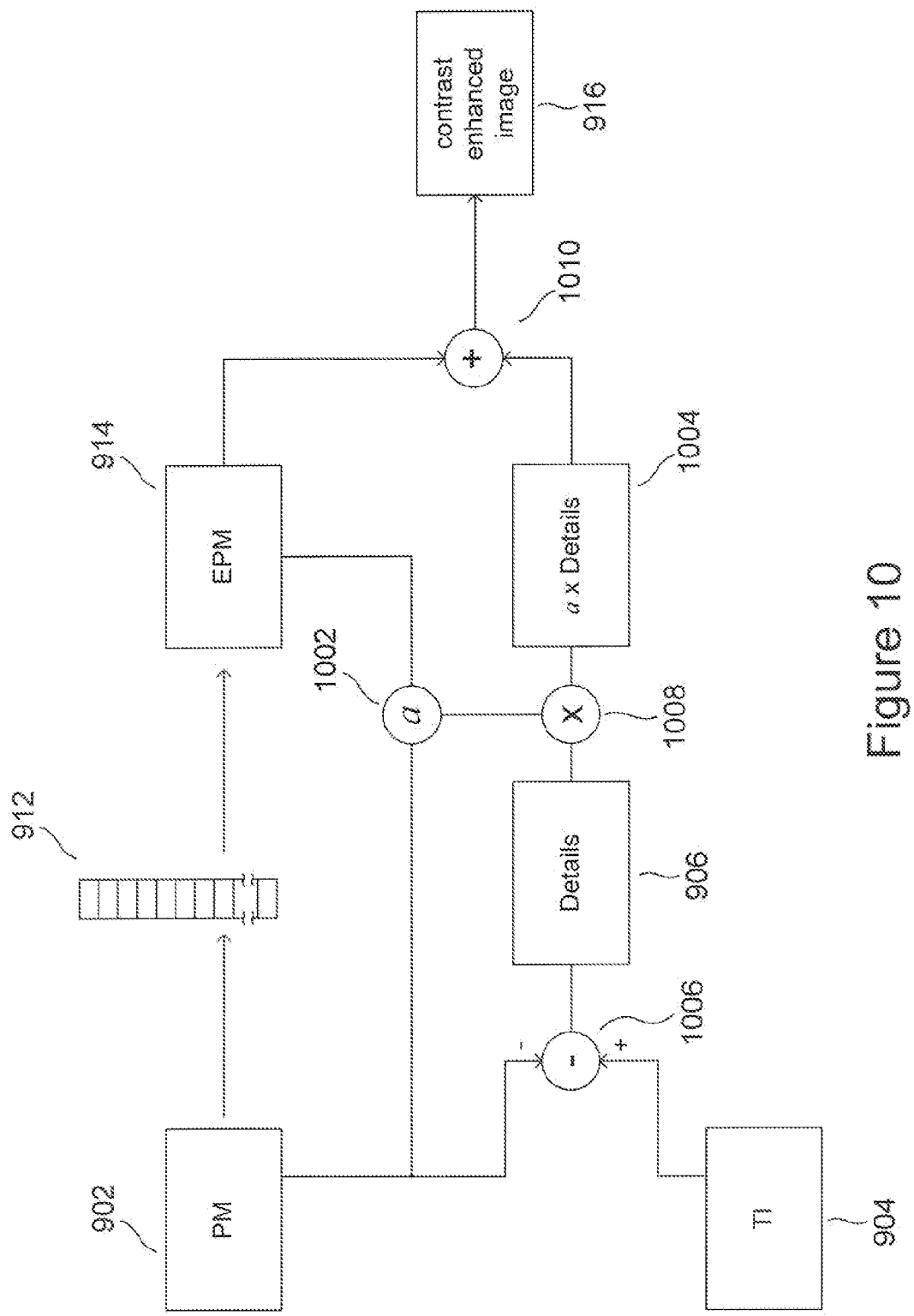
FIG. 10 illustrates a modified approach to comprehensive image enhancement.

Although FIG. 9 illustrates the general strategy for comprehensive image enhancement, it turns out that more effective image enhancement can be obtained by modifying the approach shown in FIG. 9. FIG. 10 illustrates a modified approach to comprehensive image enhancement. As in FIG. 9, the PM 902 and TI 904 are used to generate the details intermediate image 906 and the enhanced PM 914 via look-up table 912. However, rather than multiplying the details image 906 by a constant, as shown in FIG. 9, the details is transformed, pixel-by-pixel, via function a 1002 to produce a modified details temporary image 1004 in which details are amplified or compressed according to whether the region in which the details are located is amplified or compressed in the enhanced PM 914. The modified details temporary image 1004 and the enhanced PM 914 are then added together to produce the final, comprehensively contrast-enhanced image 916. The details of the computations used to produce the enhanced PM and modified details temporary image are described, in detail, in following subsections.

Figure 11:
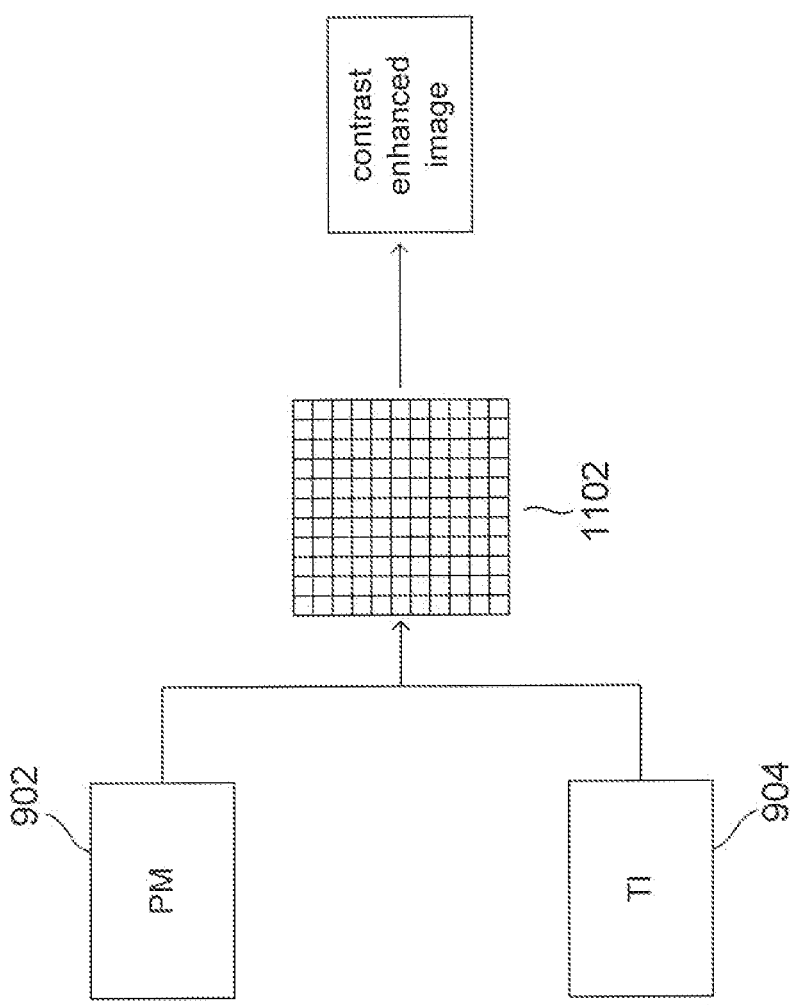
FIG. 11 shows a simplified version of the image-enhancement method shown in FIG. 10.

The comprehensive image-enhancement method shown in FIG. 10 on can be further simplified. FIG. 11 shows a simplified version of the image-enhancement method shown in FIG. 10. In the simplified version, shown in FIG. 11, the PM and TI 902 and 904 are used, pixel-by-pixel, to generate output-image pixel values via a two-dimensional look-up table 1102. The two-dimensional look-up table 1102 tabulates pre-computed values that represent a combination of the subtraction operation 1006 in FIG. 10, the one-dimensional look-up table 912 in FIG. 10, the function a 1002 in FIG. 10, the multiplication operation 1008 in FIG. 10, and the addition operation 1010 in FIG. 10. Details of all of these operations are discussed, below, in following subsections.

Thus, many facets of image enhancement, including 3D-boosting, sharpening, global contrast enhancement, local contrast enhancement other than 3D boosting, and noise removal, can be obtained by one comprehensive image-enhancement module, during a first part of which four intermediate-image pyramids are constructed in order to obtain the PM and TI intermediate images, and during a second portion of which the PM and TI intermediate images are used to generate the output image. By decomposing the input image into the PM and TI intermediate images, relatively constant-contrast portions of the image, as represented in the PM, can be used to define regions within the image for which corresponding details are amplified or compressed. Region-by-region amplification and compression produces a more natural-appearing enhanced image. The unified method provides a single module or routine for carrying out numerous different facets of image enhancement, ameliorating the issues discussed above with reference to FIGS. 6 and 7.

Next, in the following subsections, details regarding computation of each of the different types of intermediate images shown in FIG. 8A, and the details for output-image construction using the PM and TI, are provided with reference to a number of detailed figures and mathematical equations.

The Low-Pass Pyramid

As discussed above, the low-pass pyramid comprises intermediate images $f_0, f_1, \ldots, f_N$. These intermediate low-pass images $\{f_s(x, y)\}$, $s=0, 1, \ldots, N$ are obtained from an input image $f(x, y)$ as follows:

$$f_s = \begin{cases} f, & s = 0 \\ RD\{f_{s-1}\}, & s > 0. \end{cases}$$

$RD\{.\}$ is a robust decimation operator, involving of bilateral filtering, followed by 2:1 down sampling:

$$RD\{g\}(x, y) = \frac{\sum_{(a,b) \in k} g(2x-a, 2y-b)k(a, b) \varphi[g(2x-a, 2y-b) - g(2x, 2y)]}{\sum_{(a,b) \in k} k(a, b)\varphi[g(2x-a, 2y-b) - g(2x, 2y)]}$$

where $k(\ldots)$ is a convolution kernel with support K and $\phi(.)$ is a symmetric photometric kernel. In one implementation, the convolution kernel k is a 3×3 constant averaging kernel and $\phi(d)$ returns the numeric constant 1.0 for $|d|<T$ and otherwise returns 0, where T is a relatively high threshold, such as 50 for a grayscale-pixel-value-range of [0-255]. The number of scales employed in various implementations, N, is a parameter, and may be set to a value as follows: $N=\lceil \log_2[\min(w, h)] \rceil +$offset where w and h are the width and height of the input image f in pixels, and offset is a constant, such as the integer value "3."

Figure 12:
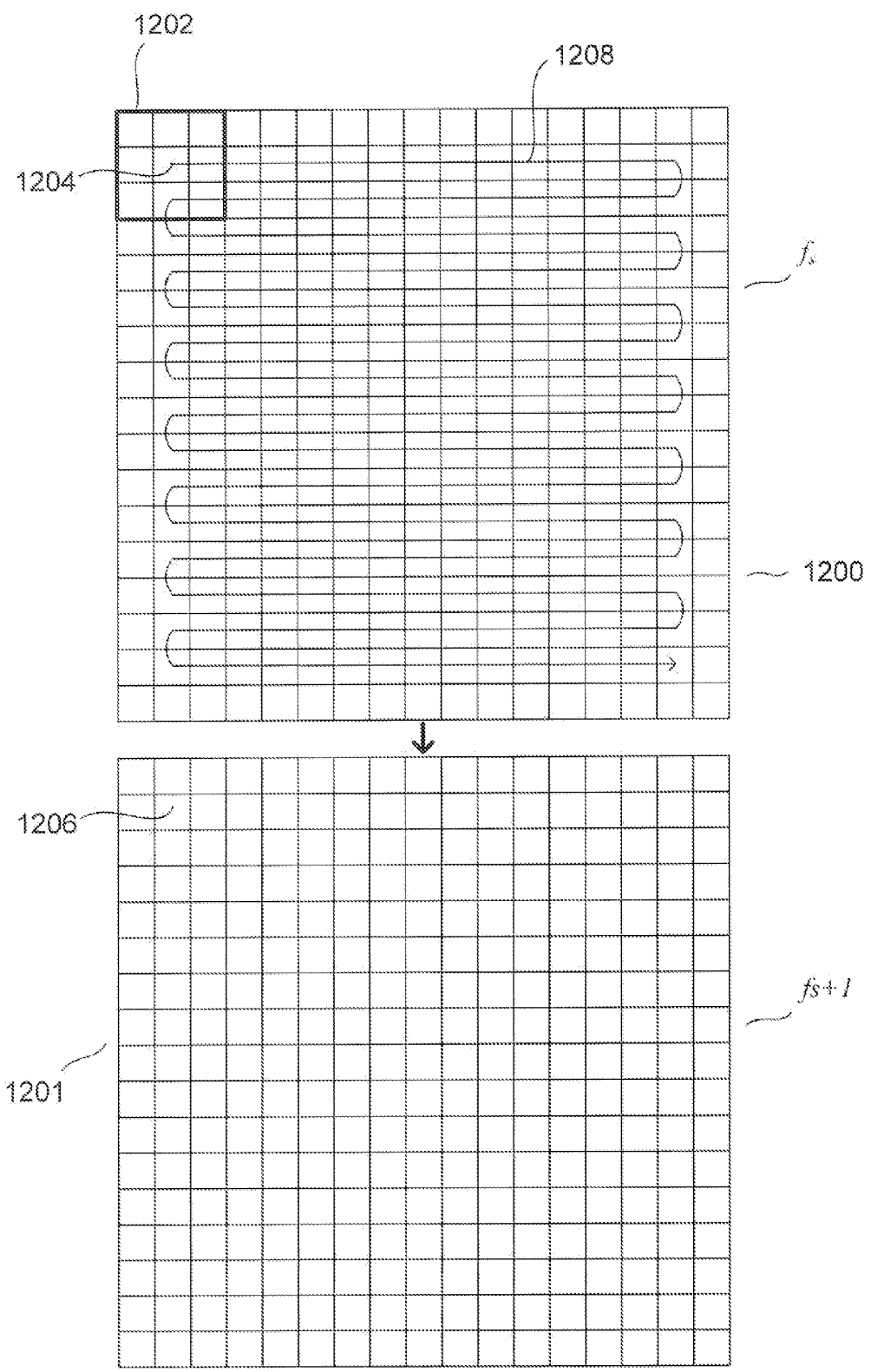
FIGS. 12-15 illustrate computation of intermediate low-pass images of the low-pass pyramid $f_i$.

FIGS. 12-15 illustrate computation of intermediate low-pass image of the low-pass pyramid $f_i$. In FIGS. 12-15, bilateral filtering is separated from downscaling, in order to illustrate the two-fold effect of the above describe robust decimation operator. In fact, in one implementation, discussed below, and described in the above-provided equations for the robust-decimation operator, both bilateral filtering and downscaling are accomplished in a single operation, As shown in FIG. 12, the bilateral filtering portion of the computation of an intermediate low-pass image involves a windowing operation, or filter operation, similar to a convolution operation. However, in a filter operation, small neighborhoods, or windows about each pixel, such as window 1202 about pixel 1204, are considered, pixel-by-pixel, with the values of the pixels within the window, or within a neighborhood about a central pixel, used to determine the corresponding value of a corresponding, lower-resolution-scale low-pass intermediate-image pixel 1206. The window is moved, with each operation, to be centered on a next pixel, with the next pixel chosen according to the path 1208 shown in FIG. 12, or another such traversal route, in which each pixel of the intermediate image $f_s$ to be transformed is considered within the context of the neighborhood about the pixel. Each pixel-and-neighborhood operation on $f_s$ generates a corresponding pixel value for $f_{s+1}$. FIG. 12 illustrates generation of the low-pass intermediate image $f_{s+1}$ from the low-pass intermediate image $f_s$. As can be seen in the above-provided mathematical description for generation of low-pass intermediate images, the highest-resolution-scale low-pass intermediate image is generally identical to the input image. It is for the lower-resolution-scale low-pass intermediate images that the technique shown in FIG. 12 is applied.

Figure 13:
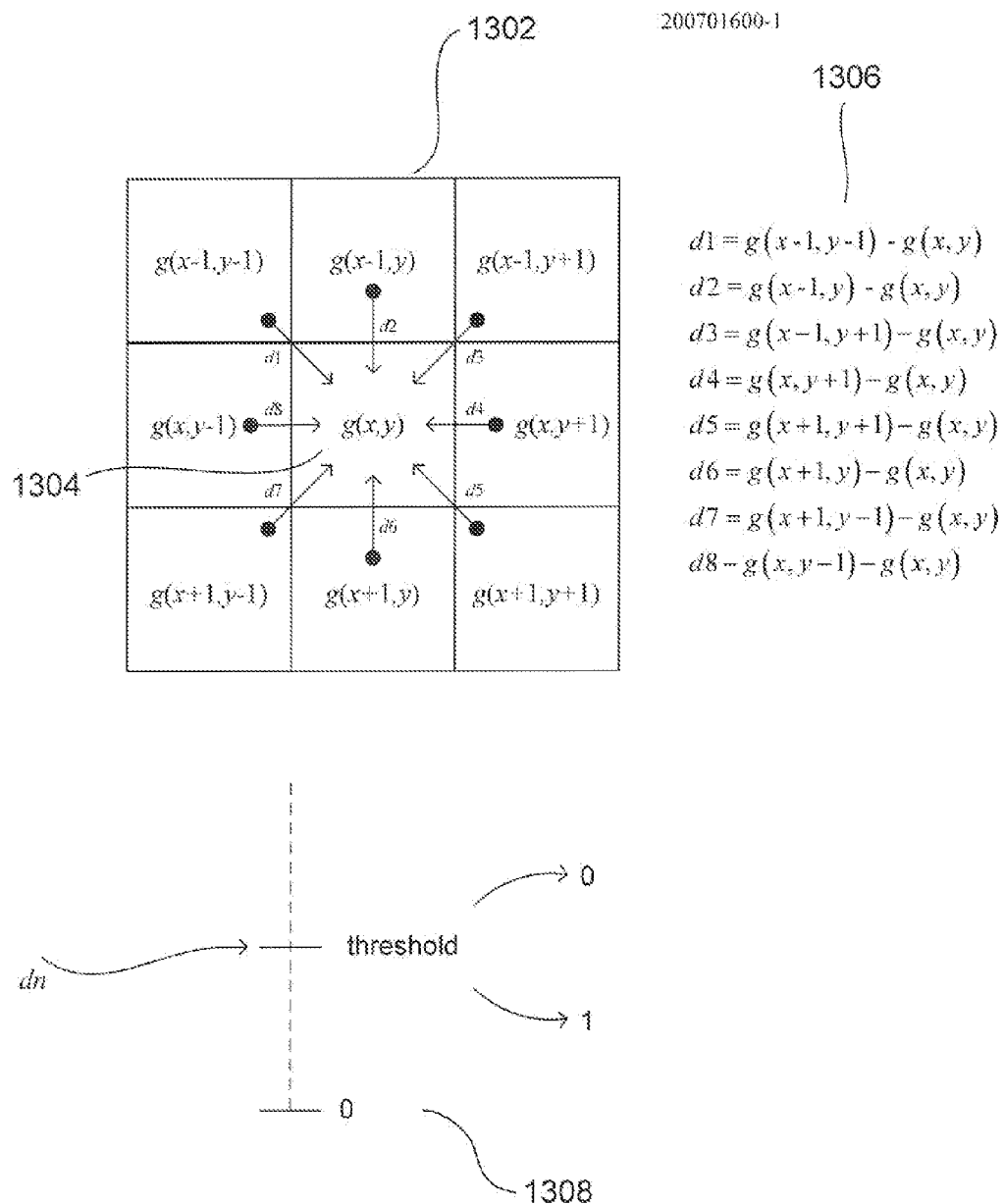

FIG. 13 shows the window, or filter, operation described in the above-provided mathematical expression. As mentioned above, a 3×3 window 1302 is employed in one implementation to represent eight nearest neighbor pixels about a central pixel 1304. In FIG. 13, the pixel values for the pixels are represented using a "g( )" notation, where g(x,y) represents the pixel value for the central pixel 1304, with the numeric value "1" added to, or subtracted from, x, y, or both x and y, are used to represent the values of the neighboring pixels, as also shown in FIG. 13. First, as indicated by the column of expressions 1306 in FIG. 13, differences d1, d2, ..., d8 are computed by considering each possible pair of pixels comprising a neighboring pixel and the central pixel. The differences dn, where n=8, are obtained by subtracting the pixel value of the central pixel within the window 1304 from the pixel value of each of the neighboring pixels, in turn. Then, as shown in the lower portion of FIG. 13 (1308), the absolute values of the dn values are thresholded to return either the value "0," when the absolute value of the difference dn is greater than a threshold value T, or the value "1," when the absolute value of the difference dn is less than the threshold T.

Figure 14:
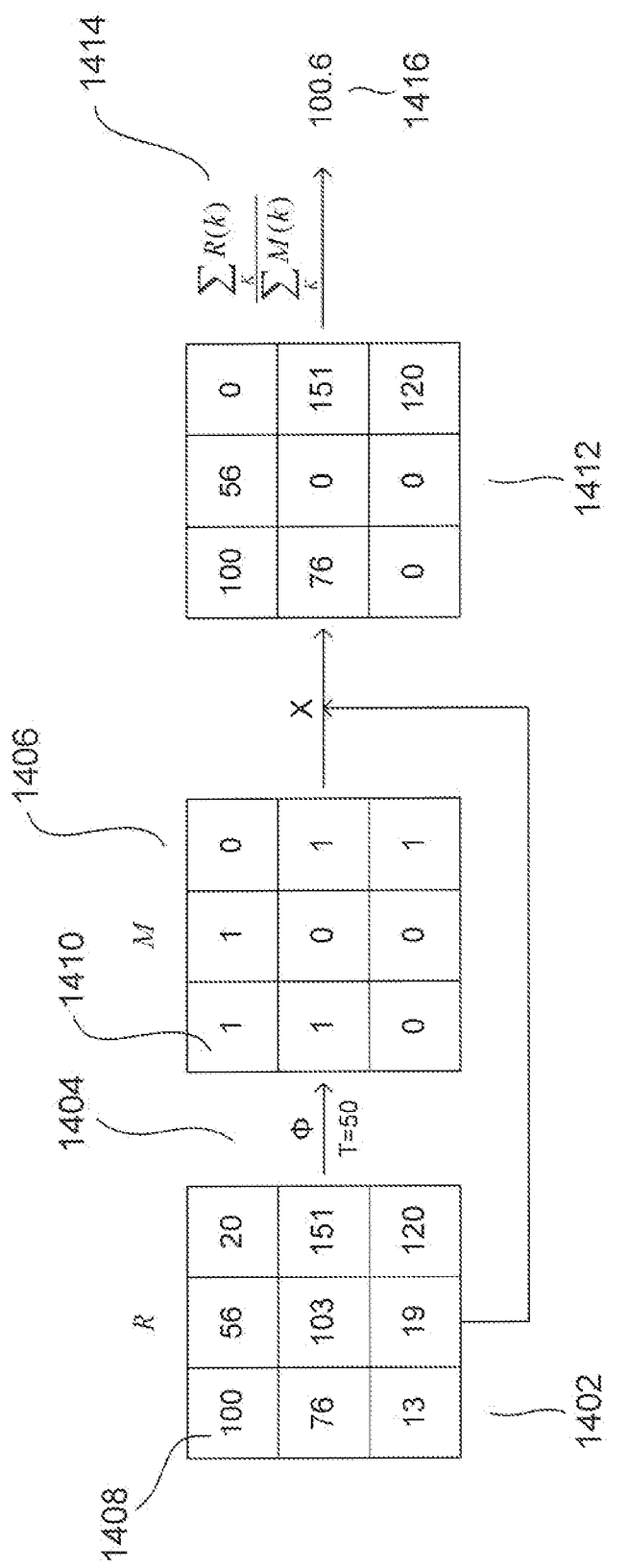

The thresholded dn values, where the thresholding function is represented by the function $\phi(.)$ in the above-provided mathematical expression, then form a mask that is convolved with the window values of the $f_s$ image to produce a resultant value for the corresponding pixel of $f_{s+1}$ prior to downscaling. FIG. 14 illustrates generation of the mask and convolution of the mask with the neighborhood to produce the pixel value of $f_{s+1}$ corresponding to the pixel of $f_s$ at the center of the window. In FIG. 14, the window or region of $f_s$, R, that includes, as the central pixel, a currently considered pixel of $f_s$ 1402, is thresholded by the function $\phi(.)$ where T=50 1404 to produce the corresponding binary mask 1406. For example, the pixel value 100 (1408) is greater than T=50, and therefore the corresponding binary-mask value is "1" (1410). The binary mask is then convolved with, or multiplies, the values of the region R 1402 to produce the convolved-region result 1412. In this result region 1412, those pixel values within the region R of $f_s$ with absolute values greater than or equal to 50 remain. The pixel values in the region R with absolute values less than T are replaced, and the resultant region 1412, with the values "0." Then, the sum of the values in the resultant region 1412 is computed, and divided by the number of non-zero pixel values within the region, as indicated by expression 1414 in FIG. 14, to produce a final resultant pixel value 1416 that is the value for the corresponding pixel $f_{s+1}$ prior to downscaling.

Figure 15:
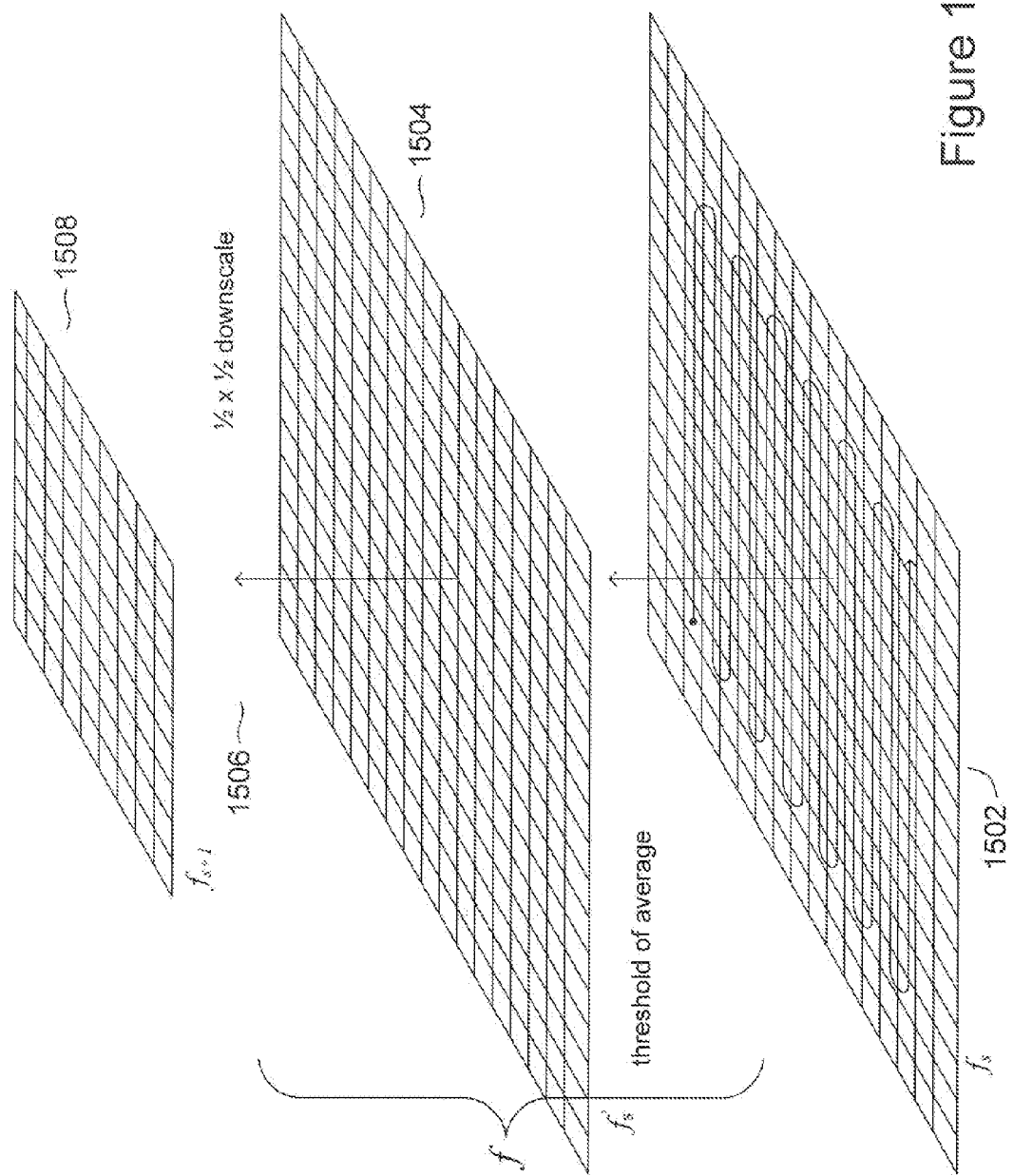

When the entire low-pass intermediate image $f_s$ (1200 in FIG. 12) is traversed, by the windowing or filtering operation described with reference to FIGS. 13 and 14, above, the resulting temporary $f_{s+1}$ intermediate image is downscaled by a ½×½ downscale operation. FIG. 15 thus shows both parts of the bilateral filtering operation represented by the above-provided mathematical expressions. As shown in FIG. 15, the low-pass intermediate image $f_s$ 1502 is first filtered, as discussed with reference to FIGS. 13-14, to produce a thresholded and averaged intermediate image $f_s$ 1504 which is then downscaled by a ½×½ downscale operation 1506 to produce the next lower-resolution-scale low-pass intermediate image $f_{s+1}$ 1508. Thus, FIGS. 12-15 graphically represent the mathematical operation described above for computing all but the highest-resolution-scale low-pass intermediate image. The result of this operation is to create a series of low-pass intermediate images in which high-contrast features have been removed.

Although the method described in FIGS. 12-15 produce the desired bilaterally filtered and downscaled low-pass intermediate image, both the bilateral filter operation and the downscaling operation are performed in a single step by the robust decimation operator described in the above provided equations. In essence, because of the factor "2" in the above equations for the robust-decimation filter, the windowing operation is actually carried out on every other pixel in the intermediate image $f_s$ in both the horizontal and vertical directions. Thus, a number of $f_{s+1}$ pixel values equal to approximately ¼ of the pixel values in $f_s$ are generated by application of the robust decimation operator described by the above-provided equations to the intermediate image $f_s$.

Computation of the Band-Pass Pyramid

The band-pass pyramid $\{l_s(x,y)\}$, s=0, 1, . . . , N, is computed from the low-pass pyramid $f_s$, described in the previous subsection, as follows:

$$l_s = \begin{cases} f_s - RI\{f_{s+1}, f_s\}, & s < N \\ f_N, & s = N \end{cases}$$

where R;{ . . . } is a novel bilateral 1:2 interpolator, which takes its weights from the higher scale image, as follows:

$$RI\{f_{s+1}, f_s\}(x, y) = \begin{cases} f_{s+1}\left(\frac{x}{2}, \frac{y}{2}\right) & x \text{ is even}, y \text{ is even} \\ \frac{g_N w_N + g_s w_s}{w_N + w_s} & x \text{ is odd}, y \text{ is even} \\ \frac{g_E w_E + g_w w_w}{w_E + w_W} & x \text{ is even}, y \text{ is odd} \\ \frac{g_{NE} w_{NE} + g_{NW} + w_{NW} +}{w_{NE} + w_{NW} + w_{SE} + w_{SW}} & x \text{ is odd}, y \text{ is odd} \end{cases}$$

where:

$$g_N = f_{s+1}\left(\frac{x-1}{2}, \frac{y}{2}\right), g_S = f_{s+1}\left(\frac{x+1}{2}, \frac{y}{2}\right),$$

$$g_W = f_{s+1}\left(\frac{x}{2}, \frac{y-1}{2}\right), g_E = f_{s+1}\left(\frac{x}{2}, \frac{y+1}{2}\right),$$

$$g_{NW} = f_{s+1}\left(\frac{x-1}{2}, \frac{y-1}{2}\right), g_{NE} = f_{s+1}\left(\frac{x-1}{2}, \frac{y+1}{2}\right)$$

-continued $$g_{SW} = f_{s+1}\left(\frac{x+1}{2}, \frac{y-1}{2}\right), g_{SE} = f_{s+1}\left(\frac{x+1}{2}, \frac{y+1}{2}\right),$$

$$w_N = \varphi[f_s(x-1, y) - f_s(x, y)], w_s = \varphi[f_s(x+1, y) - f_s(x, y)],$$

$$w_W = \varphi[f_s(x, y-1) - f_s(x, y)], w_E = \varphi[f_s(x, y+1) - f_s(x, y)],$$

$$w_{NW} = \varphi[f_s(x-1, y-1) - f_s(x, y)],$$

$$w_{NE} = \varphi[f_s(x-1, y+1) - f_s(x, y)],$$

$$w_{SW} = \varphi[f_s(x+1, y-1) - f_s(x, y)],$$

$$w_{SE} = \varphi[f_s(x+1, y+1) - f_s(x, y)].$$

Note that, in the above expressions for RI, certain of the denominators, such as the denominator WE+WW in the expression for the x-is-odd, y-is-even case. However, when the denominators are 0, the numerators are also 0, and the value of the ratio is considered to be 0, rather than an undefined value resulting from a 0-valued denominator.

Figure 16A:
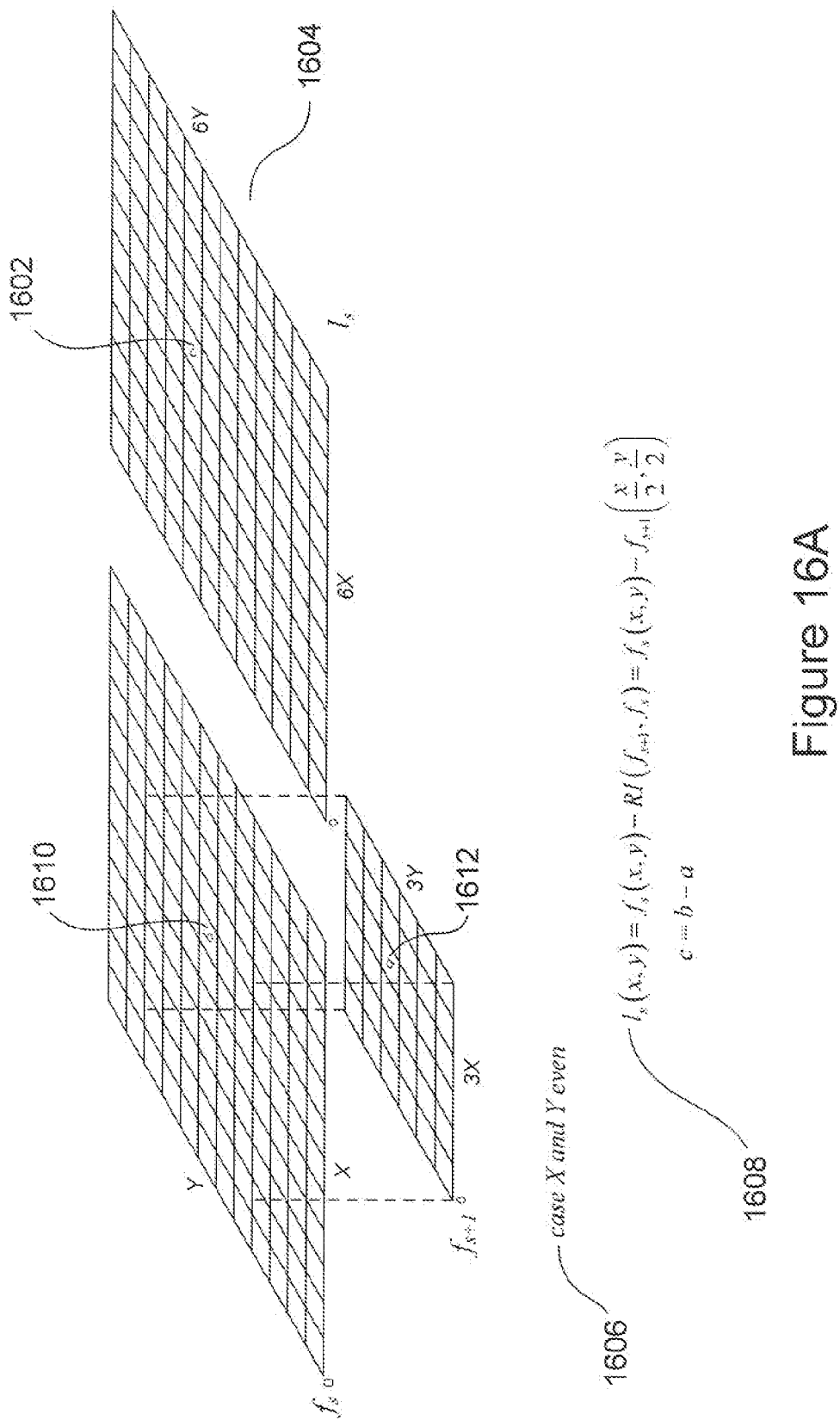
FIGS. 16A-D illustrate computation of individual pixels of a band-pass intermediate image $l_s$ from neighboring pixels in the low-pass intermediate images $f_s$ and $f_{s+1}$.
Figure 16B:
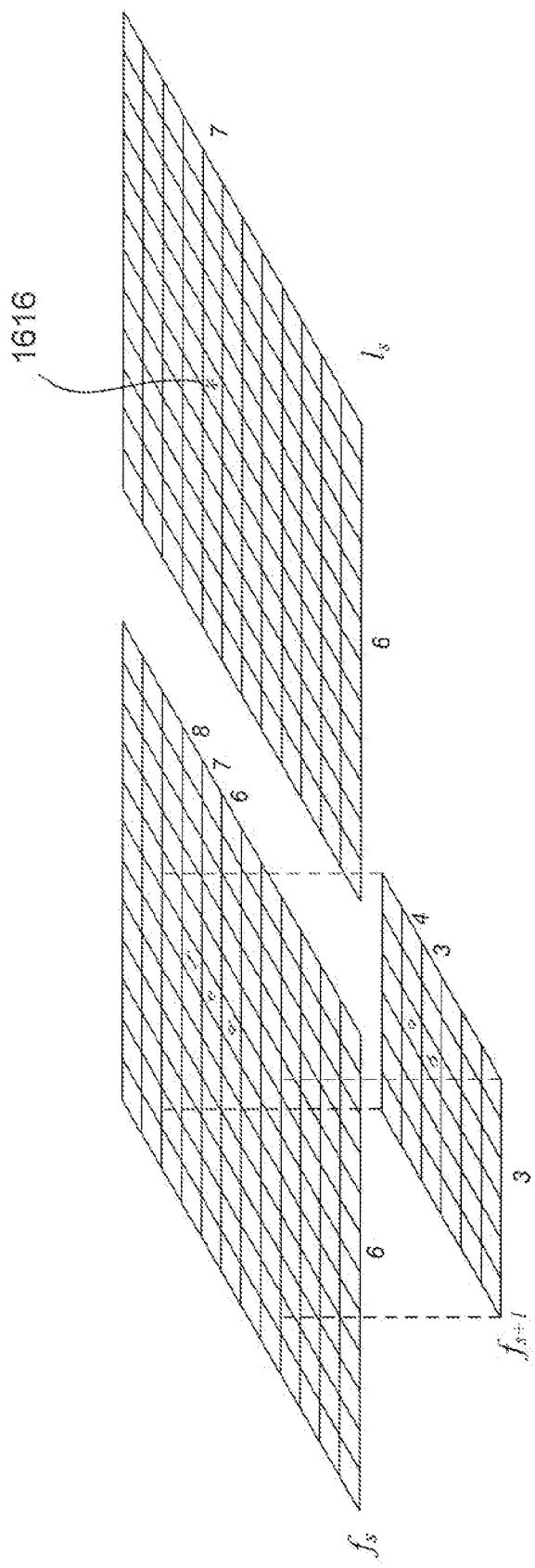
Figure 16C:
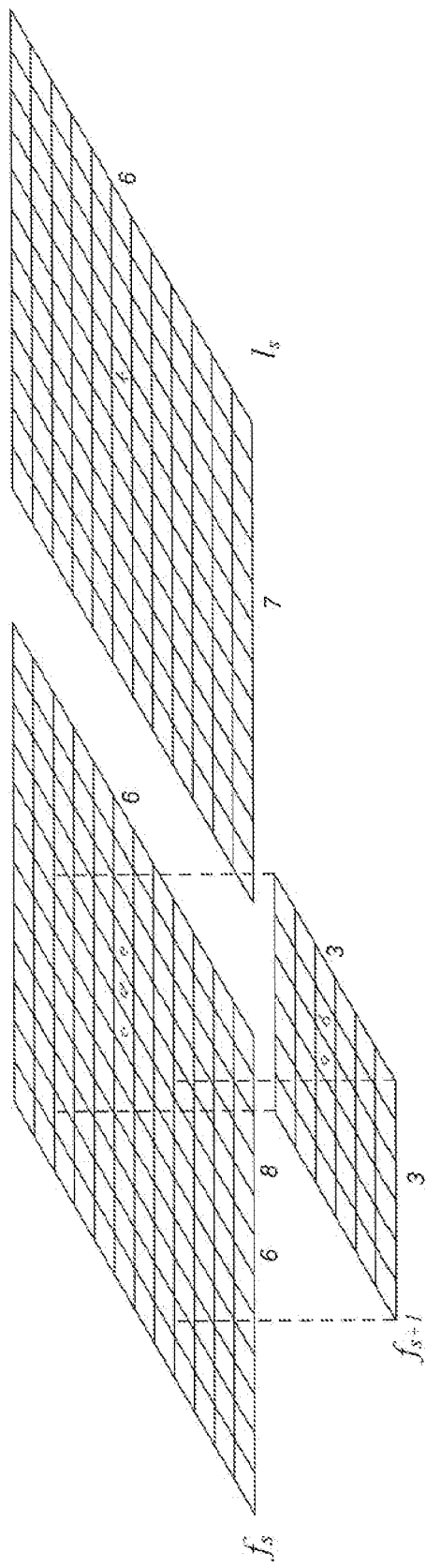
Figure 16D:
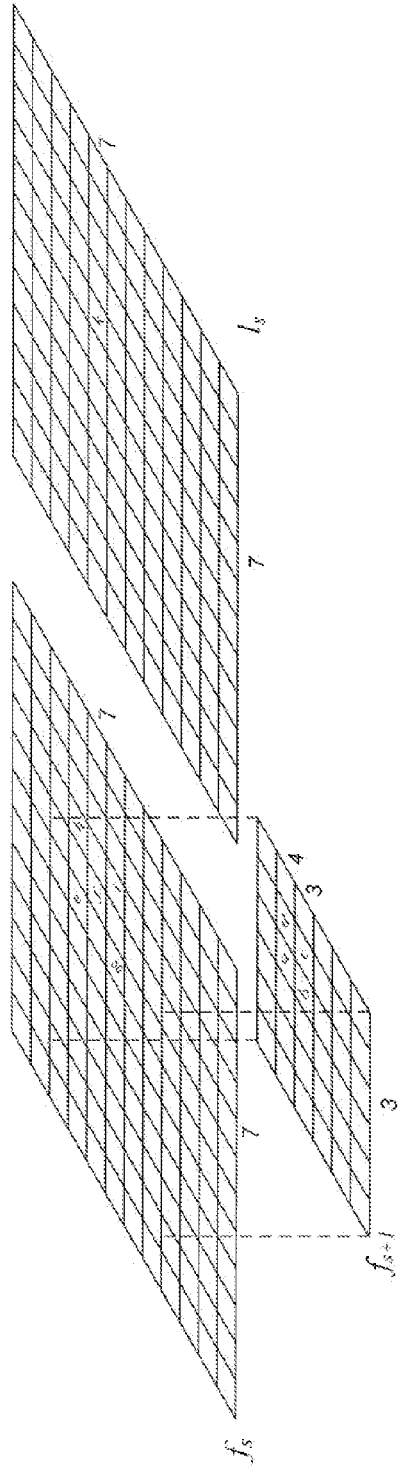

FIGS. 16A-D illustrate computation of individual pixels of a band-pass intermediate image $l_s$ from neighboring pixels in the low-pass intermediate images $f_s$ and $f_{s+1}$. Neighboring pixels in a lower-resolution-scale image are obtained by downscaling the coordinates of the corresponding pixel of the higher-resolution scale image, as will be shown, by example, in the discussion of FIGS. 16A-D. FIG. 16A corresponds to the first of four different equations for the bilateral 1:2 interpolator RI, discussed above. FIG. 16B illustrates the second of the four equations for the bilateral 1:2 interpolator RI, FIG. 16C illustrates the third of the four equations for the bilateral 1:2 interpolator RI, and FIG. 16D illustrates the fourth of the four equations for the bilateral 1:2 interpolator RI.

FIG. 16A illustrates computation of the pixel value for a pixel 1602 $l_s$ 1604 when the coordinates of the pixel in $l_s$ are both even 1606. In this case, the expression for $l_s(x,y)$ 1608 is obtained from the above-provided mathematical expression as:

$$l_s(x, y) = f_s(x, y) - RI(f_{s+1}, f_s) = f_s(x, y) - f_{s+1}\left(\frac{x}{2}, \frac{y}{2}\right)$$

As can be seen in FIG. 16A, the pixel value of $f_s(x,y)$ is b 1610 and the pixel value for $$f_{s+1}\left(\frac{x}{2}, \frac{y}{2}\right)$$

is a 1612. Thus, substituting these pixel values into the above expression, the pixel value for pixel 1602 in $l_s$ can be computed as:

$$c = b - a$$

FIG. 16B illustrates computation of the value of a pixel in a band-pass intermediate image $l_s$ 1616 in the case that the x coordinate is even and the y coordinate is odd. From the above mathematical expressions, the expression for the value of the pixel $l_s(x,y)$, k in FIG. 16B, is given by:

$$k = l_s(x, y)$$
$$= f_s - RI(f_{s+1}, f_s)$$

-continued $$= f_s - \frac{g_E w_E + g_W w_W}{w_E + w_W}$$

$$= \frac{a((f-e)<T) + b((d-e)<T)}{((f-e)<T) + ((d-e)<T)}$$

where expressions of the form (a−b)<c are Boolean-valued relational expressions, having the value 0 when a−b≥T and having the value 1 when a−b<T. FIG. 16C shows, using similar illustration conventions, computation of the pixel value of a pixel in $l_s$, $l_s(x,y)$, when x is odd and y is even. Finally, FIG. 16D shows, using similar illustration conventions as used in FIG. 16A-C, computation of a pixel value in $l_s$, $l_s(x,y)$ when both x and y are odd.

Thus, computation of a band-pass intermediate image is a pixel-by-pixel operation that uses corresponding pixels, and pixels neighboring those corresponding pixels, in $f_s$ and $f_{s+1}$. The band-pass intermediate images retain medium-contrast details, with high-contrast details and low-contrast details removed.

PM Intermediate Image Computation

The intermediate images $r_s$ of the PM intermediate-image pyramid are computed as follows:

$$r_s = \begin{cases} l_s, & s = N \\ Rl\{r_{s+1}, f_s\} + l_s[1 - \varphi(l_s)], & s < N \end{cases}$$

where the term $l_s[1-\phi(l_s)]$ returns $l_s$, if the absolute value of $l_s$ is larger than T, and 0 otherwise.

Figure 17:
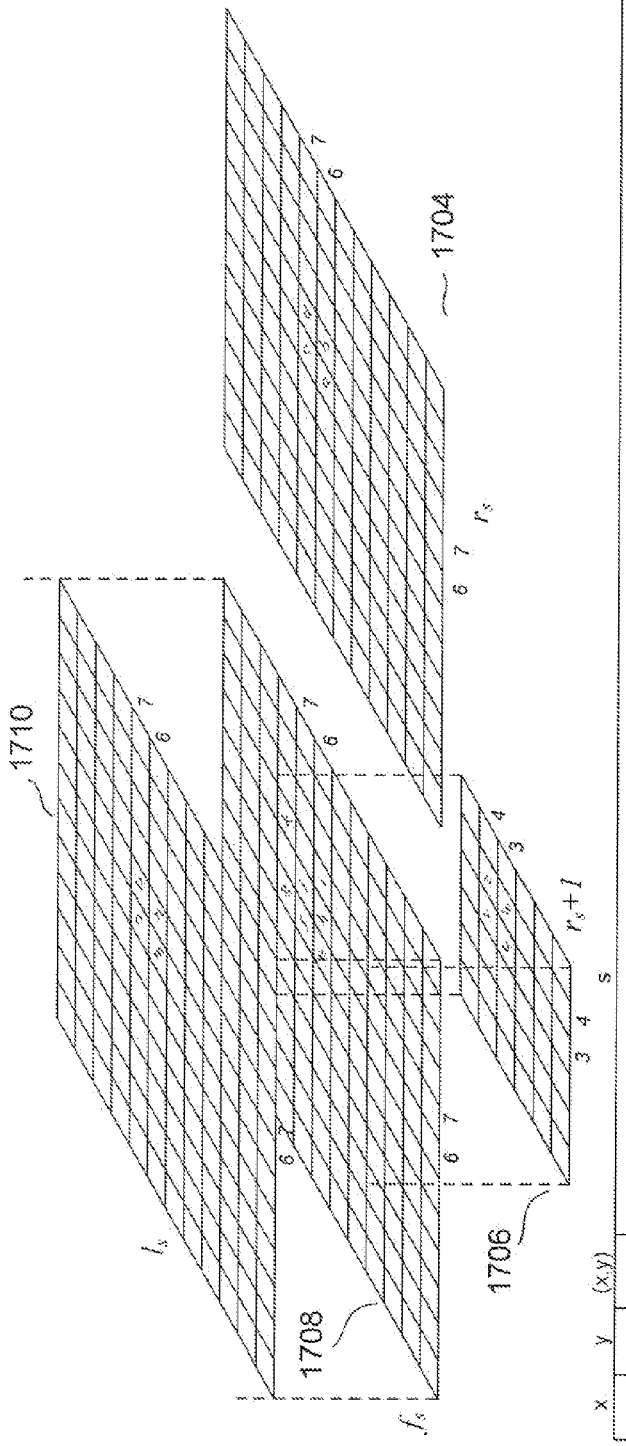
FIG. 17 illustrates, using similar illustrations as used in FIGS. 16A-D, computation of pixels in $r_s$ for four different coordinate-parity cases.

FIG. 17 illustrates, using similar illustrations as used in FIGS. 16A-D, computation of pixels in $r_s$ for four different coordinate-parity cases. Each coordinate-parity case represents one choice of the coordinates x and y being either odd or even. The table 1702 in the lower portion of FIG. 17 illustrates mathematical expressions for each of the four different coordinate-parity cases, derived from the above generalized mathematical expression for computing $r_s$. As discussed above, the PM intermediate image $r_s$ 1704 is computed based on the next-lower-scale PM intermediate image $r_{s+1}$ 1706, the low-pass intermediate image $f_s$ 1708, and the band-pass intermediate image $l_s$ 1710. The PM intermediate images have all low and mid-contrast details removed, leaving a high-resolution photographic mask in the highest-resolution-scale PM intermediate image $r_0$.

Computation of the TI Intermediate Images

Computation of the TI intermediate images $t_s$ is a pixel-by-pixel operation involving the next-lowest-scale TI intermediate image $t_{s+1}$, the low-pass intermediate image $f_s$ and the band-pass intermediate image $l_s$, expressed as follows:

$$t_s = \begin{cases} l_s, & s = N \\ Rl\{t_{s+1}, f_s\} + l_s[1 - \psi(l_s)], & s < N \end{cases}$$

where $\Psi$ is a function defined as follows:
when $|l_s(x,y)|>T$, $$\Psi[l_s(x,y)] = l_s(x,y),$$

when $|l_s(x,y)|<T_N$, where $T_N$ is a scale-dependent some noise threshold, $$\Psi[l_s(x,y)] = c_N l_s(x,y), \text{ where } c_N<1.$$

when $T_N \leq |l_s(x,y)| \leq T$, $$\Psi[l(x,y)] = \min\{c_s(l_s(x,y) - TN) + c_N T_N, T\},$$

where $c_s \geq 1$

Figure 18:
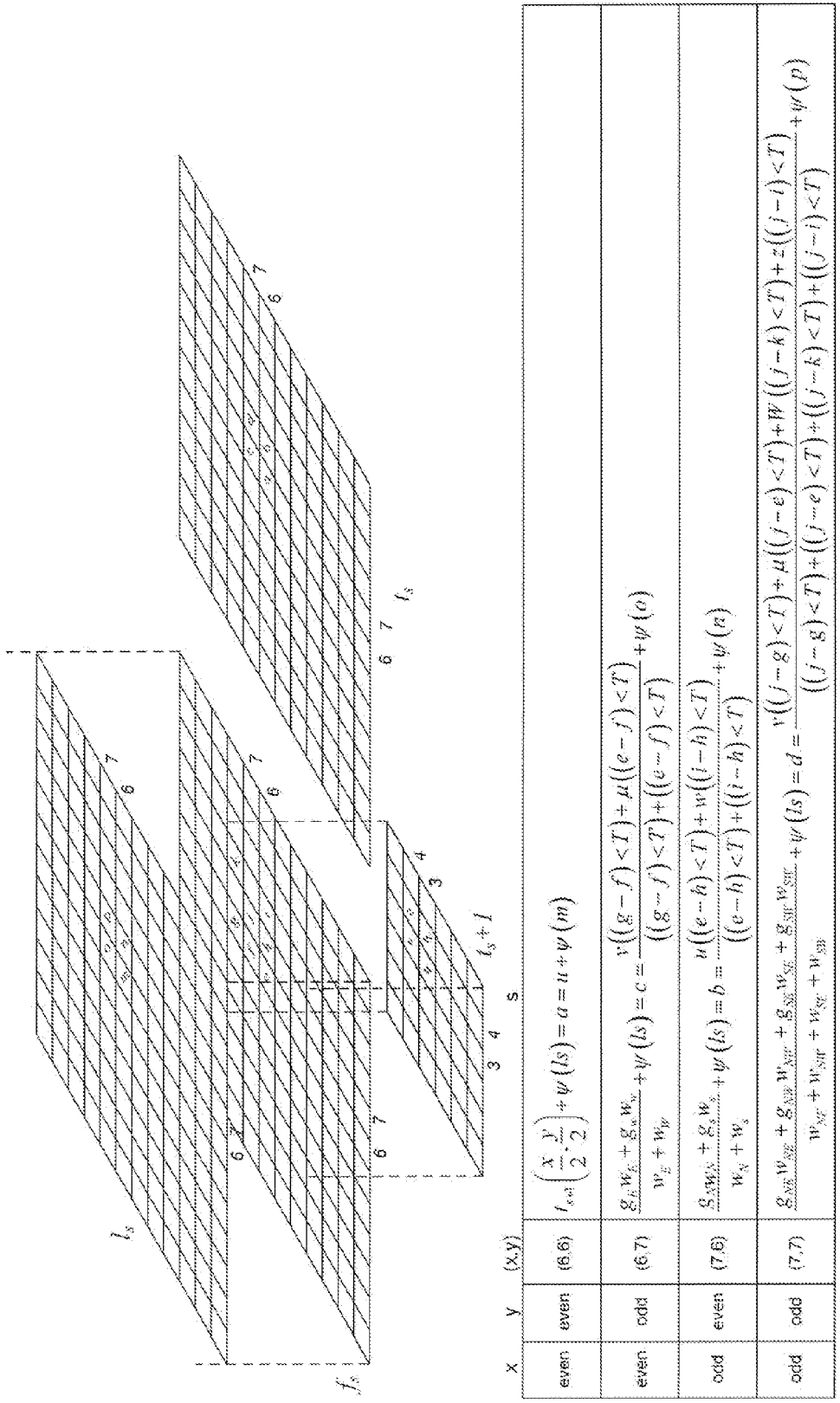
FIG. 18 illustrates, using similar illustration conventions to those used in FIGS. 16A-D and FIG. 17, computation of pixels in $t_s$ for each of the coordinate-parity cases.

FIG. 18 illustrates, using illustration conventions similar to those used in FIGS. 16A-D and FIG. 17, computation of pixels in $l_s$ for each of the coordinate-parity cases. Note that the function $\Psi$ depends on the threshold values $T_N$ and constants $c_N$ and $c_s$, and thus, in FIG. 18, symbolic values returned by $\Psi$ are not provided, with values returned by $\Psi$ simply indicated by functional notation. The TI intermediate images retain high-contrast details, include enhanced mid-contrast details, and include compressed or reduced low-contrast details. In other words, strong or high-contrast edges are not over-sharpened, details are enhanced, and noise is reduced. In general, $T_N$ is set to a value greater than 0 for the highest-resolution scales. $C_N$ is, in one implementation, set to 0.5. The threshold $T_N$ is determined, based on an estimate of the noise within an image, by any of various noise-estimation techniques. In alternative implementations, $c_N$ may include two multiplicative terms, one constant for all scales, and the other increasing for the highest-resolution scales. The first of the multiplicative terms accounts for 3D boosting, and the latter of the multiplicative terms provides for sharpening. For a "pure 3D-boosting" effect, the amount of enhancement of the mid-contrast details should be constant across scales. When this amount varies, other effects may be achieved, in addition to 3D-boosting. For instance, if the amount of enhancement increases as the scale becomes smaller, or, in other words, closer to the original scale, sharpening is achieved.

Computation of Output Image Based on PM and TI

Returning to FIG. 10, details of the computation of the output contrast-enhanced image are next provided. Each pixel of the output image, o(x,y) is obtained from the corresponding pixels of the temporary image t(x,y) and the photographic mask m(x,y) by:

$$o(x, y) = L[m(x, y)] + d(x, y)a(x, y)$$

where $d(x, y) = t(x, y) - m(x, y)$, and $$a(x, y) = \begin{cases} L[m(x, y)]/m(x, y), & L[m(x, y)] \geq m(x, y) \\ \dfrac{(255 - L[m(x, y)])}{(255 - m(x, y))} & \text{otherwise.} \end{cases}$$

Thus, if the currently considered pixel is in a region that is brightened by a multiplicative factor greater than 1, from $a_1$ to $a_2 > a_1$, then the function a returns the value $a_2/a_1$. However, when the region is being darkened, from $a_1$ to $a_2$ where $a_2 < a_1$, then the function a returns $(255-a_2)/(255-a_1)$ which is equivalent to inverting the input image, multiplying the particular region by a constant larger than 1, and then re-inverting the input image. These computations, represented by the above expressions, can be pre-computed for all t and in values, and incorporated into the two-dimensional look-up table 1102 in FIG. 11 as follows:

$$L_2(t,m) = (m) + (t-m)a$$

for all t and in ranging from 0 to 255, where a is equal to L(m)/m if L(m)≥m, or (255−L(m))/(255−m) otherwise.

With the two-dimensional look-up table L2 precomputed, the output image can be generated by a lookup operation, as shown in FIG. 11:

$$o(x,y) = L_2[t(x,y), m(x,y)]$$

One advantage of using the 2D LUT is that one may ensure that no saturation occurs at grayscale or luminance endpoints, such 0 and 255 for a 256-value grayscale or luminance range, by rounding the curve towards (0,0) or (255,255) as |t-m| increases.

The one-dimensional look-up table L that appears in the above expressions, and that is incorporated in the two-dimensional look-up table $L_2$, can have many different forms and values. In one implementation, the one-dimensional look-up table L simultaneously performs three tasks: (1) image histogram stretching; (2) gamma correction for brightening or darkening the image, as appropriate; and (3) shadow lighting and highlight detailing. This one-dimensional look-up table is computed from a histogram and normalized cumulative histogram of the grayscale values of black-and-white images or the luminance channel of color images. Lookup tables are generally discrete representations of arbitrary functions applied to pixel values, and many different functions can be represented by a lookup table to accomplish many different purposes.

Figure 19:
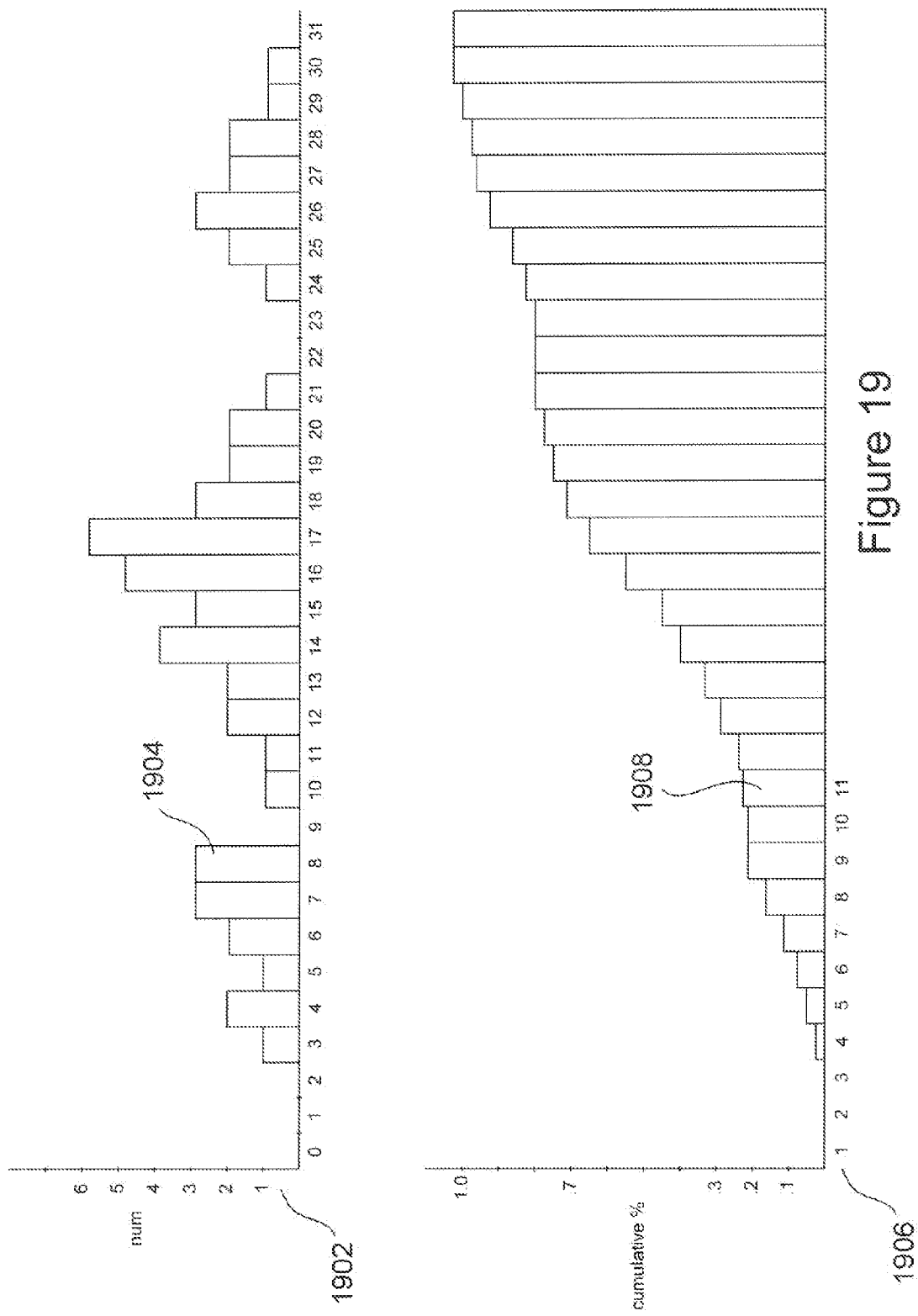
FIG. 19 shows an example histogram and cumulative histogram.

FIG. 19 shows an example histogram and cumulative histogram. The example histogram 1902 shows the number of pixels within an image having each of the possible luminance or grayscale values. In FIG. 19, the histogram and cumulative histogram are based on 32 possible grayscale or luminance-channel values, but in many systems, the number of possible values is at least 256. Thus, in the histogram 1902 shown in FIG. 19, the bar 1904 indicates that there are three pixels within the image having grayscale value or luminance-channel value 8. The histogram can be expressed as:

$$h(x)$$

where x is grayscale or luminance value and h(x) determines the number of pixels in an image having the grayscale or luminance-channel value x.

A normalized cumulative histogram $\bar{h}(x)$ 1906 corresponding to the histogram 1902 is provided in the lower portion of FIG. 19. In a normalized cumulative histogram, each column represents the fraction of pixels within an image having grayscale or luminance values equal to or less than a particular x-axis value. For example, in the normalized cumulative histogram 1906 in FIG. 19, corresponding to histogram 1902 in FIG. 19, the vertical bar 1908 indicates that 25 percent of the pixels in the image have grayscale or luminance-channel values equal to, or less than, 11. As can be seen in the normalized cumulative histogram shown in FIG. 19, the normalized cumulative histogram function $\bar{h}(x)$ is a non-decreasing function ranging from 0.0 to 1.0. The normalized cumulative histogram can be expressed as:

$$\bar{h}(x) = \frac{\sum_{y=0}^{x} h(y)}{\sum_{y=0}^{255} h(y)}$$

Figure 20:
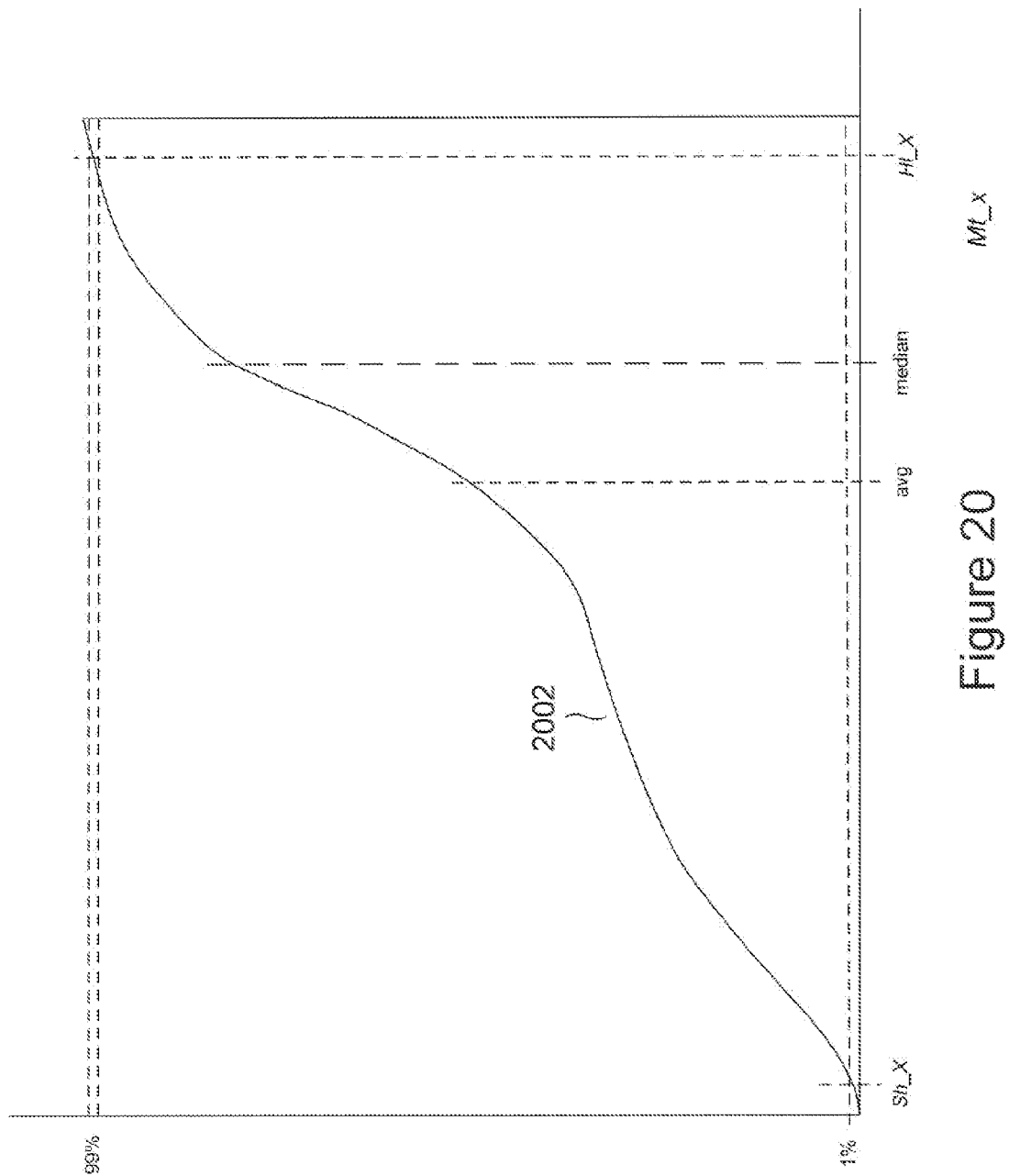
FIG. 20 shows a hypothetical normalized cumulative histogram for an example image.

FIG. 20 shows a hypothetical normalized cumulative histogram for an example image. The normalized cumulative histogram function $\bar{h}(x)$ 2002 is displayed as a somewhat bimodal curve. Three values Sh_X, Mt_X, and Hl_X are computed from the normalized cumulative histogram as indicated in FIG. 20. Sh_X is the grayscale or luminance-channel value X for which $\bar{h}(x)$ returns 0.01. Hl_X is the X value for which $\bar{h}(x)$ returns 0.99. Mt_X can be defined either as the average value or median value of the grayscale values or luminance-channel values of the image. For example, the median of the luminance-channel values is a value X such that $\bar{h}(x) \leq 0.5$ and $\bar{h}(x+1) > 0.5$. The value Sh_X is referred to as the "input shadows," the value Hl_X is referred to as the "input highlights," and the value Mt_X is referred to as the "input mid-tones." Corresponding values Sh_Y, referred to as "output shadows," Hl_Y, referred to as "output highlights," and Mt_Y, referred to as "output mid-tones," are computed, in one implementation as:

$$Sh\_Y=(Sh\_X+(0.01\times255))/2,$$

$$Hl\_Y=(Hl\_X+(0.99\times255))/2$$

$$Mt\_Y=(Mt\_X+128)/2$$

In one implementation, the one-dimensional look-up table L can then be computed, using the above-derived terms as well as a strength parameter s, by:

$$L(x) = (Hl\_Y - Sh\_y)\left(\frac{x - Sh\_X}{Hl\_X - Sh\_X}\right)^{\alpha 2^{s\beta}} + Sh\_Y,$$

for $Sh\_X \leq x \leq Hl\_X$ where $$\alpha = \log\left[\frac{(Mt\_Y - Sh\_Y)(Hl\_X - Sh\_X)}{(Mt\_X - Sh\_X)(Hl\_Y - Sh\_Y)}\right], \text{ and}$$

$$\beta = \left(\frac{Hl\_Y - Sh\_Y}{Mt\_Y - Sh\_Y}\right)\left(\frac{x - Sh\_X}{Hl\_X - Sh\_X}\right)^{\alpha} - 1.$$

For x smaller than Sh_X, L(x)=x(Sh_Y/Sh_X), and for x larger than Hl_X, L(x)=255−(255−x)(255−Hl_Y)/(255−Hl_X).

Figure 21:
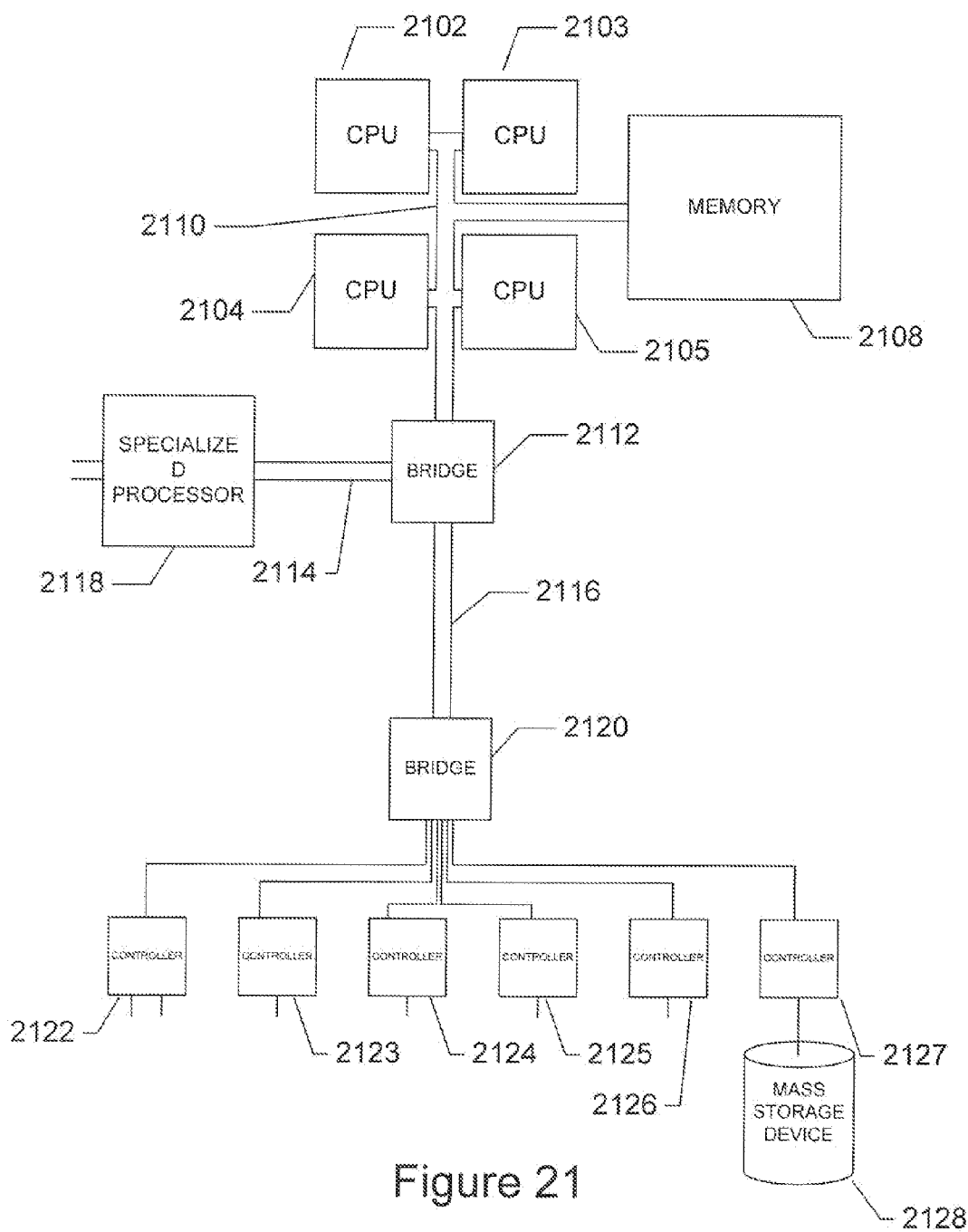
FIG. 21 illustrates a general-purpose computer architecture suitable for executing the above-described image processing methods and thereby constituting an image-processing system.

FIG. 21 illustrates a general-purpose computer architecture suitable for executing the above-described image processing methods and thereby constituting an image-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains at least one processing component, and, in the computer-system architecture shown in FIG. 21, one or multiple central processing units ("CPUs") 2102-2105. The computer system additionally includes one or more electronic memories 2108 interconnected with the CPUs by a CPU/memory-subsystem bus 2110 or multiple busses, a first bridge 2112 that interconnects the CPU/memory-subsystem bus 2110 with additional busses 2114 and 2116, or other types of high-speed interconnection media, including multiple, high-speed serial interconnects. These busses or serial interconnections, in turn, connect the CPUs and memory with specialized processors, such as a graphics processor 2118, and with one or more additional bridges 2120, which are interconnected with high-speed serial links or with multiple controllers 2122-2127, such as controller 2127, that provide access to various different types of mass-storage devices 2128, electronic displays, input devices, and other such components, subcomponents, and computational resources. The electronic displays, including visual display screen, audio speakers, and other output interfaces, and the input devices, including mice, keyboards, touchscreens, and other such input interfaces, together constitute input and output interfaces that allow the computer system to interact with human users.

The magnetic disk platters, optical disks, or solid-state electronic memories of mass-storage devices are one example of a computer-readable medium on or within which data can be stored and from which stored data can be retrieved by a computer system. Additional examples of computer-readable media include removable disks, including optical and magnetic disks, electronic random access memories of various types, and flash memory. As would be well understood by those familiar with computing and electronics, the phrase "computer-readable medium," in the contexts of data storage and encoding of instructions of computer programs, refers to tangible, physical media, such as those described above, and not to electromagnetic waves and other transmission media used for transmission of data.

Although various of the currently claimed methods and systems have been described in terms of particular implementations, it is not intended that the present invention be limited to these implementations. Modifications within the spirit of the present invention will be apparent to those skilled in the art. For example, any number of different implementations can be obtained through varying various programming parameters, including programming language, control structures, data structures, modular organization, variable names, and other such programming parameters. The disclosed methods and systems can be tailored to specific applications by adjusting a number of different parameters. For example, any number of different implementations can be obtained by using different one-dimensional look-up tables, derived in alternative fashions to the above-provided description of one one-dimensional look-up table implementation. As another example, a variety of different intermediate-image computations can be employed, using larger windows, different thresholds and thresholding functions, different scalings, and by varying other such parameters.

It is appreciated that the previous description is provided to enable any person skilled in the art to make or use the present disclosure. Various modifications to the disclosed examples of image-processing methods will be readily apparent to those skilled in the art, and the generic principles defined herein may be applied to other types of image and signal processing without departing from the spirit or scope of the disclosure. Thus, the present disclosure is not intended to be limited to that disclosed in this document, but is instead to be accorded the widest scope consistent with the principles and novel features disclosed herein.

The invention claimed is:

1. A signal-processing system comprising:
a processing component; and
a memory storing a signal-processing routine, which when executed causes the processing component to enhance an input image to produce an enhanced output image and store the output image in the memory by
computing, by constructing multi-scale intermediate-image pyramids, a photographic-mask intermediate image, without low-contrast details, in which smooth, homogeneous regions are separated by high-contrast edges, and a temporary-image intermediate image with enhanced mid-contrast detail, retained high-contrast detail, and reduced low-contrast detail,
wherein constructing multi-scale intermediate-image pyramids further includes constructing a low-pass pyramid, a band-pass pyramid, a photographic-mask pyramid, and a temporary-image pyramid, wherein each pyramid has a number of intermediate images at different scales ranging from a highest-resolution intermediate image to a lowest-resolution intermediate image, and
employing values of the photographic-mask intermediate image and the temporary-image intermediate image to produce the output image that is stored in the memory and that is globally and locally contrast-enhanced, sharpened, and denoised, with global contrast enhancements including one or more of brightening, darkening, histogram stretching or equalization, and gamma correction and local contrast enhancements including one or more of adaptive lighting, shadow lighting, highlight enhancement, and 3D boosting.

2. The signal-processing system of claim 1 wherein each pyramid has a number N of intermediate images at N different scales ranging from the highest-resolution intermediate image at scale 1 to the lowest-resolution intermediate image at scale N.

3. The signal-processing system of claim 2 wherein the low-pass pyramid includes low-pass intermediate images, the highest-resolution low-pass intermediate image equivalent to the input image and each additional lower-resolution low-pass intermediate image $f_i$ computed from a next-higher-resolution low-pass intermediate image $f_{i-1}$ by applying a robust decimation operator, pixel-value-by-pixel-value, to selected pixel values of the next-higher-resolution low-pass intermediate image $f_{i-1}$.

4. The signal-processing system of claim 2 wherein the band-pass pyramid includes band-pass intermediate images, the lowest-resolution band-pass intermediate image equivalent to the lowest-resolution low-pass intermediate image $f_N$ and each additional higher-resolution band-pass intermediate image $l_i$ computed from a next-lower-resolution low-pass intermediate image $f_{i+1}$ and low-pass intermediate image $f_i$, at a resolution equal to that of $r_i$, by applying a bilateral interpolation operator, pixel-value-by-pixel-value, to selected pixel values of the low-pass intermediate images $f_{i+1}$ and $f_i$.

5. The signal-processing system of claim 2 wherein the band-pass pyramid includes photographic-mask intermediate images, the lowest-resolution photographic-mask intermediate image equivalent to the lowest-resolution band-pass intermediate image $l_N$ and each additional higher-resolution photographic-mask intermediate image $r_i$ computed from a next-lower-resolution photographic-mask intermediate image $r_{i+1}$, a low-pass intermediate image $f_i$, at a resolution equal to that of $r_i$, and a band-pass intermediate image $l_i$, at a resolution equal to that of $r_i$, by applying a reconstruction procedure, pixel-value-by-pixel-value, to selected pixel values of the next-lower-resolution photographic-mask intermediate image $r_{i+1}$, the low-pass intermediate image $f_i$, and the band-pass intermediate image $l_i$.

6. The signal-processing system of claim 2 wherein the temporary-image pyramid includes temporary-image intermediate images, the lowest-resolution temporary-image intermediate image equivalent to the lowest-resolution band-pass intermediate image $l_N$ and each additional higher-resolution temporary-image intermediate image $t_i$ computed from a next-lower-resolution temporary-image intermediate image $t_{i+1}$, a low-pass intermediate image $f_i$, at a resolution equal to that of $t_i$, and a band-pass intermediate image $l_i$, at a resolution equal to that of $t_i$, by applying a reconstruction procedure, pixel-value-by-pixel-value, to selected pixel values of the next-lower-resolution temporary-image intermediate image $t_{i+1}$, the low-pass intermediate image $f_i$, and the band-pass intermediate image $l_i$.

7. The signal-processing system of claim 2 wherein the photographic mask intermediate image is the highest-resolution intermediate image in the photographic-mask pyramid and wherein the temporary-image intermediate image is the highest-resolution image in the temporary-image pyramid.

8. The signal-processing system of claim 1 wherein employing values of the photographic-mask intermediate image and temporary-image intermediate image to produce the output image that is globally and locally contrast-enhanced, sharpened, and denoised further comprises:
subtracting the photographic mask intermediate image from the temporary-image intermediate image to produce a details image;
carrying out a 1-dimensional lookup-table operation on the photographic mask intermediate image to produce an enhanced photographic mask intermediate image;
modifying the details image to produce a modified details image; and
combining the enhanced photographic mask intermediate image and the modified details image to produce the globally and locally contrast-enhanced, sharpened, and denoised output image.

9. The signal-processing system of claim 8 wherein modifying the details image to produce a modified details image further comprises one of:
generating a multiplier for each pixel value in the details image as a function of corresponding and neighboring pixel values in the enhanced photographic mask intermediate image and the photographic mask intermediate image, and multiplying the pixel values of the details image, pixel-value-by-pixel-value, by the generated multipliers to produce the modified details image; and
multiplying the pixel values of the details image, pixel-value-by-pixel-value, by a constant value to produce the modified details image.

10. The signal-processing system of claim 1 wherein employing values of the photographic-mask intermediate image and temporary-image intermediate image to produce the output image that is globally and locally contrast-enhanced, sharpened, and denoised further comprises:
generating, pixel-value-by-pixel-value, pixel values of the output image by using corresponding pixel values of the photographic mask intermediate image and the temporary-image intermediate image as indexes into a 2-dimensional lookup table.

11. A method that enhances an input image to produce an enhanced output image, the method comprising:
computing, by constructing multi-scale intermediate-image pyramids, a photographic-mask intermediate image, without low-contrast details, in which smooth, homogeneous regions are separated by high-contrast edges, and a temporary-image intermediate image with enhanced mid-contrast detail, retained high-contrast detail, and reduced low-contrast detail,
wherein constructing multi-scale intermediate-image pyramids includes constructing a low-pass pyramid, a band-pass pyramid, a photographic-mask pyramid, and a temporary-image pyramid, wherein each pyramid has a number of intermediate images at different scales ranging from a highest-resolution intermediate image to a lowest-resolution intermediate image;
employing values of the photographic-mask intermediate image and the temporary-image intermediate image to produce the output image that is globally and locally contrast-enhanced, sharpened, and denoised, with global contrast enhancements including one or more of brightening, darkening, histogram stretching or equalization, and gamma correction and local contrast enhancements including one or more of adaptive lighting, shadow lighting, highlight enhancement, and 3D boosting; and
storing the output image in one or more memories.

12. The method of claim 11 wherein each pyramid has a number N of intermediate images at N different scales ranging from the highest-resolution intermediate image at scale 1 to the lowest-resolution intermediate image at scale N.

13. The method of claim 12 wherein the low-pass pyramid includes low-pass intermediate images, the highest-resolution low-pass intermediate image equivalent to the input image and each additional lower-resolution low-pass intermediate image $f_i$ computed from a next-higher-resolution low-pass intermediate image $f_{i-1}$ by applying a robust decimation operator, pixel-value-by-pixel-value, to selected pixel values of the next-higher-resolution low-pass intermediate image $f_{i-1}$.

14. The method of claim 12 wherein the band-pass pyramid includes band-pass intermediate images, the lowest-resolution band-pass intermediate image equivalent to the lowest-resolution low-pass intermediate image $f_N$ and each additional higher-resolution band-pass intermediate image $l_i$ computed from a next-lower-resolution low-pass intermediate image $f_{i+1}$ and low-pass intermediate image $f_i$, at a resolution equal to that of $r_i$, by applying a bilateral interpolation operator, pixel-value-by-pixel-value, to selected pixel values of the low-pass intermediate images $f_{i+1}$ and $f_i$.

15. The method of claim 12 wherein the band-pass pyramid includes photographic-mask intermediate images, the lowest-resolution photographic-mask intermediate image equivalent to the lowest-resolution band-pass intermediate image $l_N$ and each additional higher-resolution photographic-mask intermediate image $r_i$ computed from a next-lower-resolution photographic-mask intermediate image $r_{i+1}$, a low-pass intermediate image $f_i$, at a resolution equal to that of $r_i$, and a band-pass intermediate image $l_i$, at a resolution equal to that of $r_i$, by applying a reconstruction procedure, pixel-value-by-pixel-value, to selected pixel values of the next-lower-resolution photographic-mask intermediate image $r_{i+1}$, the low-pass intermediate image $f_i$, and the band-pass intermediate image $l_i$.

16. The method of claim 12 wherein the temporary-image pyramid includes temporary-image intermediate images, the lowest-resolution temporary-image intermediate image equivalent to the lowest-resolution band-pass intermediate image $l_N$ and each additional higher-resolution temporary-image intermediate image $t_i$ computed from a next-lower-resolution temporary-image intermediate image $t_{i+1}$, a low-pass intermediate image $f_i$, at a resolution equal to that of $t_i$, and a band-pass intermediate image $l_i$, at a resolution equal to that of $t_i$, by applying a reconstruction procedure, pixel-value-by-pixel-value, to selected pixel values of the next-lower-resolution temporary-image intermediate image $t_{i+1}$, the low-pass intermediate image $f_i$, and the band-pass intermediate image $l_i$.

17. The method of claim 12 wherein the photographic mask intermediate image is the highest-resolution intermediate image in the photographic-mask pyramid and wherein the temporary-image intermediate image is the highest-resolution image in the temporary-image pyramid.

18. The method of claim 11 wherein employing values of the photographic-mask intermediate image and temporary-image intermediate image to produce the output image that is globally and locally contrast-enhanced, sharpened, and denoised further comprises:

subtracting the photographic mask intermediate image from the temporary-image intermediate image to produce a details image;

carrying out a 1-dimensional lookup-table operation on the photographic mask intermediate image to produce an enhanced photographic mask intermediate image;

modifying the details image to produce a modified details image; and combining the enhanced photographic mask intermediate image and the modified details image to produce the globally and locally contrast-enhanced, sharpened, and denoised output image.

19. The method of claim 18 wherein modifying the details image to produce a modified details image further comprises one of:

generating a multiplier for each pixel value in the details image as a function of corresponding and neighboring pixel values in the enhanced photographic mask intermediate image and the photographic mask intermediate image, and multiplying the pixel values of the details image, pixel-value-by-pixel-value, by the generated multipliers to produce the modified details image; and multiplying the pixel values of the details image, pixel-value-by-pixel-value, by a constant value to produce the modified details image.

20. The method of claim 11 wherein employing values of the photographic-mask intermediate image and temporary-image intermediate image to produce the output image that is globally and locally contrast-enhanced, sharpened, and denoised further comprises:

generating, pixel-value-by-pixel-value, pixel values of the output image by using corresponding pixel values of the photographic mask intermediate image and the temporary-image intermediate image as indexes into a 2-dimensional lookup table.

* * * * *